(12) United States Patent
Spooner et al.

(10) Patent No.: US 9,075,998 B2
(45) Date of Patent: Jul. 7, 2015

(54) DIGITAL DELIVERY SYSTEM AND USER INTERFACE FOR ENABLING THE DIGITAL DELIVERY OF MEDIA CONTENT

(71) Applicant: Fox Entertainment Group, Inc., Los Angeles, CA (US)

(72) Inventors: Elaine M. Spooner, Winnetka, CA (US); John D. Koscheka, Los Angeles, CA (US); Michael Scott Bessolo, Glendale, CA (US); Mark L. Simpson, Monterey Park, CA (US); Jean L. Yuan, Manhattan Beach, CA (US); J. Craig D. Russell, Winnetka, CA (US); Christopher M. Bettes, Los Angeles, CA (US); Greg McCarthy, Santa Monica, CA (US); Srinivas Kundula, Portola Hills, CA (US); Venkata Nagaraju Mantena, Trabuco Canyon, CA (US)

(73) Assignee: FOX ENTERTAINMENT GROUP, INC., Los Angeles, CA (US)

( * ) Notice: Subject to any disclaimer, the term of this patent is extended or adjusted under 35 U.S.C. 154(b) by 0 days.

(21) Appl. No.: 14/047,729

(22) Filed: Oct. 7, 2013

(65) Prior Publication Data

US 2014/0041057 A1   Feb. 6, 2014

Related U.S. Application Data

(62) Division of application No. 13/090,993, filed on Apr. 20, 2011, now Pat. No. 8,584,256.

(60) Provisional application No. 61/326,538, filed on Apr. 21, 2010.

(51) Int. Cl.
*G06F 21/00* (2013.01)
*G06F 21/60* (2013.01)

(Continued)

(52) U.S. Cl.
CPC ............ *G06F 21/60* (2013.01); *G06Q 30/0257* (2013.01); *G06Q 30/0601* (2013.01)

(58) Field of Classification Search
CPC ...................................................... G06F 21/60
USPC ............................................................ 726/27
See application file for complete search history.

(56) References Cited

U.S. PATENT DOCUMENTS 5,732,184 A   3/1998   Chao et al.
(Continued)

FOREIGN PATENT DOCUMENTS

CN   101091217   9/2006
JP   2003-153152   5/2003
(Continued)

OTHER PUBLICATIONS

Office Action from U.S. Appl. No. 13/090,997 dated Dec. 11, 2012.
(Continued)

*Primary Examiner* — Morshed Mehedi
(74) *Attorney, Agent, or Firm* — Gates & Cooper LLP

(57) ABSTRACT

A system, method, and computer readable storage medium provide multi-platform accessibility of media content in a global computer network. Media content is selected in a client computer. Based on a format of the content, a media content player is loaded. If the content is not digital rights managements (DRM) protected, it is loaded and played in the player. If the content is DRM protected, a license to play the content is requested via an API and obtained via a server process. A web server computer creates/updates an authorized client user by communicating with a DRM server. The web server then creates a session with the DRM server and enables authorization to play by communicating with the DRM server that transmits the license to the client computer. Based on the license, the client loads and plays the content in the player.

9 Claims, 18 Drawing Sheets

(51) Int. Cl.
*G06Q 30/02* (2012.01)
*G06Q 30/06* (2012.01)

(56) References Cited

U.S. PATENT DOCUMENTS

| | | | |
|---|---|---|---|
| 6,950,825 B2 | 9/2005 | Chang et al. | |
| 7,103,374 B2 | 9/2006 | Yla-Jaaski et al. | |
| 7,110,984 B1 | 9/2006 | Spagna et al. | |
| 7,280,529 B1 | 10/2007 | Black et al. | |
| 7,336,646 B2 | 2/2008 | Muller | |
| 7,376,338 B2 | 5/2008 | Kim et al. | |
| 7,613,704 B2 | 11/2009 | Lobo | |
| 8,208,788 B2 | 6/2012 | Ando et al. | |
| 8,312,552 B1* | 11/2012 | Hadden et al. | 726/26 |
| 2002/0010759 A1* | 1/2002 | Hitson et al. | 709/219 |
| 2002/0031262 A1 | 3/2002 | Imagawa et al. | |
| 2002/0138844 A1 | 9/2002 | Otenasek et al. | |
| 2003/0001880 A1 | 1/2003 | Holtz et al. | |
| 2003/0028889 A1 | 2/2003 | McCoskey et al. | |
| 2003/0164844 A1* | 9/2003 | Kravitz et al. | 345/700 |
| 2005/0278729 A1 | 12/2005 | Lamkin et al. | |
| 2006/0021057 A1* | 1/2006 | Risan et al. | 726/26 |
| 2006/0089912 A1 | 4/2006 | Spagna et al. | |
| 2006/0195909 A1* | 8/2006 | Boswell et al. | 726/26 |
| 2006/0259434 A1 | 11/2006 | Vilcauskas et al. | |
| 2007/0038567 A1 | 2/2007 | Allaire et al. | |
| 2007/0050467 A1 | 3/2007 | Borrett et al. | |
| 2007/0073626 A1 | 3/2007 | Reeder et al. | |
| 2007/0079224 A1 | 4/2007 | Limberg | |
| 2007/0206799 A1* | 9/2007 | Wingert et al. | 380/285 |
| 2007/0250761 A1 | 10/2007 | Bradley et al. | |
| 2008/0010648 A1 | 1/2008 | Ando et al. | |
| 2008/0077492 A1 | 3/2008 | Ho et al. | |
| 2008/0112440 A1 | 5/2008 | Bedekar et al. | |
| 2008/0120324 A1 | 5/2008 | Davis | |
| 2008/0170622 A1 | 7/2008 | Gordon et al. | |
| 2008/0228578 A1 | 9/2008 | Mashinsky | |
| 2008/0301058 A1 | 12/2008 | Campbell et al. | |
| 2008/0307310 A1 | 12/2008 | Segal et al. | |
| 2008/0307343 A1 | 12/2008 | Robert et al. | |
| 2009/0012935 A1 | 1/2009 | Beged-Dov et al. | |
| 2009/0025085 A1* | 1/2009 | Kim et al. | 726/26 |
| 2009/0122978 A1* | 5/2009 | Gorissen et al. | 380/28 |
| 2009/0144157 A1 | 6/2009 | Saracino et al. | |
| 2009/0150797 A1 | 6/2009 | Burkholder et al. | |
| 2009/0165080 A1* | 6/2009 | Fahn et al. | 726/1 |
| 2009/0225910 A1 | 9/2009 | Suzuki et al. | |
| 2009/0327079 A1 | 12/2009 | Parker et al. | |
| 2010/0107258 A1* | 4/2010 | Park et al. | 726/26 |
| 2010/0114642 A1 | 5/2010 | Dufosse et al. | |
| 2010/0131385 A1 | 5/2010 | Harrang et al. | |
| 2010/0189265 A1* | 7/2010 | Ito et al. | 380/285 |
| 2010/0205261 A1 | 8/2010 | Michel | |
| 2011/0061108 A1 | 3/2011 | Arrasvuori et al. | |
| 2011/0166918 A1 | 7/2011 | Allaire et al. | |
| 2011/0167499 A1 | 7/2011 | Strom et al. | |
| 2011/0265150 A1 | 10/2011 | Spooner et al. | |
| 2011/0306027 A1* | 12/2011 | Bridges et al. | 434/322 |
| 2012/0101904 A1 | 4/2012 | Spooner et al. | |
| 2013/0097302 A9* | 4/2013 | Khedouri et al. | 709/224 |

FOREIGN PATENT DOCUMENTS

| | | |
|---|---|---|
| JP | 2003330840 | 11/2003 |
| JP | 2004-229231 | 8/2004 |
| JP | 2007013909 | 1/2007 |
| JP | 2007-528630 | 10/2007 |
| JP | 2008125102 | 5/2008 |
| JP | 2008-283489 | 11/2008 |
| JP | 2008278121 | 11/2008 |
| JP | 2009-501491 | 1/2009 |
| JP | 2009217332 | 9/2009 |
| JP | 2000-083192 | 2/2015 |
| JP | 2008-085888 | 2/2015 |
| KR | 10-0722992 | 5/2007 |
| KR | 10-2009-0097750 | 9/2014 |
| WO | 2007/011537 | 1/2007 |
| WO | 2009/073583 | 6/2009 |
| WO | 2011/060439 | 5/2011 |
| WO | 2011/109523 | 9/2011 |
| WO | 2011/109527 | 9/2011 |
| WO | 2012/030965 | 3/2012 |

OTHER PUBLICATIONS

Amendment from U.S. Appl. No. 13/090,997 dated Mar. 11, 2013.
Restriction Requirement from U.S. Appl. No. 13/091,005 dated Nov. 8, 2012.
Response to Restriction Requirement from U.S. Appl. No. 13/091,005 dated Dec. 11, 2012.
Office Action from U.S. Appl. No. 13/091,005 dated Jan. 14, 2013.
Int'l Search Report for PCT Application No. PCT/US2011/049971 filed on Aug. 31, 2011.
"Technical Overview of Single Frequency Network", www.enensys.com.
White, R. et al., "How Computers Work (7th Edition)", QUE, Oct. 2003.

* cited by examiner

| FOXFAST March 31, 2010 | | Welcome Elaine Spooner! | Title Search | | Search |
|---|---|---|---|---|---|

Home | Titles ▼ | My Video Playlists ▼ | Tools ▼ | Site Tour

Not you? Log Out  User Preferences

Advanced Search — 602  604

🛒 (2 titles / 49 assets / 1BQ Asset)

Title Cart

Titles | Assets | Empty Cart

Options

Sort by ○ A-Z ● Release Date | View ○▦ ●▦ ○▦  — 600 — Page ◁ 1 ▷

Product Category ▶
- ☑ Feature Films
- ☑ Series
- ☑ Seasons
- ☑ Episodes
- ☑ Miniseries
- ☑ Original Movies for TV
- ☑ Specials
- ☑ Formats-Scripted
- ☑ Formats-unscripted
- ☑ Select All/ Unselect All

Access ▶
- ☑ Licensed
- ☑ Not Licensed

Run Time ▶
- ☑ Half-Hour
- ☑ One Hour
- ☑ <=90 Minutes
- ☑ 91-120 Minutes
- ☑ >120 Minutes
- ☑ Select All/ Unselect All ☑ Check / Uncheck All    ☑ Other ▼    Total Titles: 2

Favorites > Title Cart

☑ BURN NOTICE -02 -TURN AND BURN    17-Jul-2008    BC1202    ☆ 👤

☑ BURN NOTICE -02    2008    BC1200    ☆ 👤

Total Titles: 2 | View 10|25|50|100 Non-Licensed Titles

☐ Licensed Titles  ▨ In The Spotlight  ▭ Access Coming Soon  ▬ Non-Licensed Titles Contact | Feedback | Merchandising | US Broadcast Schedule | Legal | Help
TM & © Fox and its related entities

FIG. 7

Title List Access Options ▸BACK TO TOP

By default, include the following in my tittle list:
☑ Licensed
☑ Not Licensed

Title List Status Options ▸BACK TO TOP

☐ Approved
☐ Approval Cancelled

Default Homepage ▸BACK TO TOP

● All Titles ○ Licensed Titles ○ Playlists ○ New ○ Favorites ○ Saved Search: [Select a Saved Search....]

Default Asset View ▸BACK TO TOP

● Group  ○ Ungroup

Video Streaming ▸BACK TO TOP

○ Fast Internet Connection (Play Immediately)
● Slow Internet Connection (Wait Before Play)

FIG. 8B

Default Homepage ▶BACK TO TOP

●All Titles ○Licensed Titles ○Playlists ○New ○Favorites○Saved Search: [Select a Saved Search...▼]

Default Asset View ▶BACK TO TOP

●Group ○Ungroup

Video Streaming ▶BACK TO TOP

○ Fast Internet Connection (Play Immediately)
● Slow Internet Connection (Wait Before Play)

Default Product Category Filter Options ▶BACK TO TOP

By default, include the following in my title list:
☑ Feature Films
☑ Series
☐ Seasons
☐ Episodes
☑ Miniseries
☑ Original Movies for TV
☑ Specials
☑ Formats-Scripted
☑ Formats-unscripted
☐ Select All/ Unselect All

[Save Changes]

Contact l Feedback l Merchandising l US Broadcast Schedule l Legal l Help
TM &© Fox and its related entities

FIG. 8C

FOXFAST March 31, 2010

Welcome Elaine Spooner!
Not you? Log Out  User Preferences

Home | Titles ▽ | My Video Playlists ▽ | Tools ▽ | Site Tour

Title Search [        ] [Search]  ☐ Screening Room Only
Advanced Search

Glee,' 'Modern Family' win Peabodys / "Glee," "Modern Family" and Kermit the Frog were among the 36 recipients of Peabody Awards unveiled.../
MGM debt holders agree to fourth extension / Despite any gru /

☆ (2 titles / 14 assets / 1BQ Asset)

News From Fox                                                                  expand ▷
Screening Room                                                                collapse ▽

| All | My Playlist | In The Spotlight | My Season Pass | Clear My Playlist | Sort by: ● A-Z ○ Release Date ○ Date Added/Updated |
|---|---|---|---|---|---|
| ▷ 8AFF01 | 24-08 | 4:00 P.M. - 5:00 P.M. | Video Screener - Full Episode - English | | [MORE] |
| ▷ 8AFF01 | 24-08 | 4:00 P.M. - 5:00 P.M. | Video Screener - Two-Hour - Seamless - English | | [MORE] |
| ▷ 8AFF02 | 24-08 | 5:00 P.M. - 6:00 P.M. | Video Screener - Full Episode - English | | [MORE] |
| ▷ 8AFF03 | 24-08 | 6:00 P.M. - 7:00 P.M. | Video Screener - Full Episode - English | | [MORE] |
| ▷ 8AFF03 | 24-08 | 6:00 P.M. - 7:00 P.M. | Video Screener - Two-Hour - Seamless - English | | [MORE] |
| ▷ 8AFF04 | 24-08 | 7:00 P.M. - 8:00 P.M. | Video Screener - Full Episode - English | | [MORE] |
| ▷ 8AFF05 | 24-08 | 8:00 P.M. - 9:00 P.M. | Video Screener - Full Episode - English | | [MORE] |
| ▷ 8AFF06 | 24-08 | 9:00 P.M. - 10:00 P.M. | Video Screener - Full Episode - English | | [MORE] |
| ▷ 8AFF07 | 24-08 | 10:00 P.M. - 11:00 P.M. | Video Screener - Full Episode - English | | [MORE] |

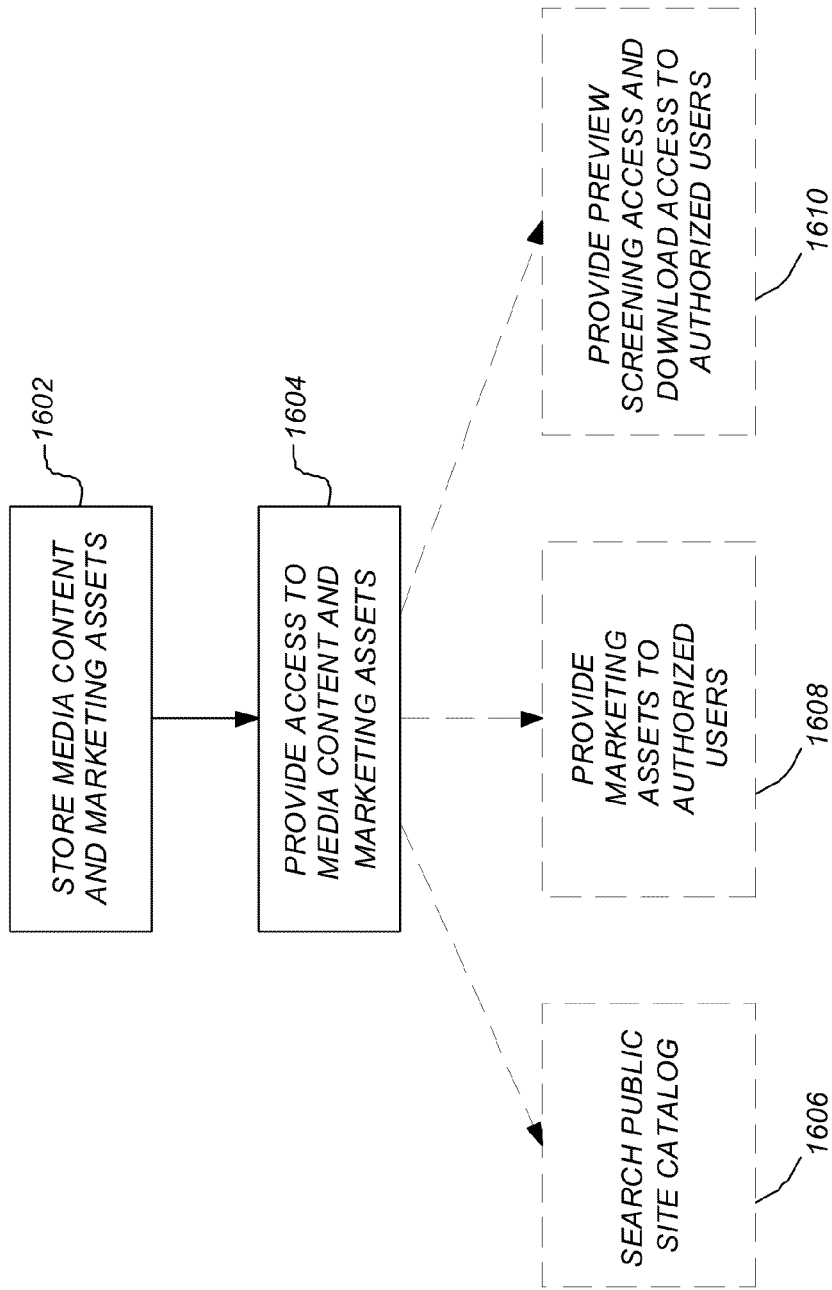

DIGITAL DELIVERY SYSTEM AND USER INTERFACE FOR ENABLING THE DIGITAL DELIVERY OF MEDIA CONTENT

CROSS-REFERENCE TO RELATED APPLICATIONS

This application is a divisional application of U.S. patent application Ser. No. 13/090,993, filed on Apr. 20, 2011, now U.S. Pat. No. 8,584,256, issued on Nov. 12, 2013, entitled "Digital Delivery System and User Interface for Enabling the Digital Delivery of Media Content", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRIVINAS KUNDULA, and VENKATA NAGARAJU MANTENA, which application claims the benefit under 35 U.S.C. Section 119(e) of U.S. Provisional Patent Application Ser. No. 61/326,538, filed on Apr. 21, 2010, entitled "DIGITAL DELIVERY SYSTEM AND USER INTERFACE FOR ENABLING THE DIGITAL DELIVERY OF MEDIA CONTENT" by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA;

This application is related to the following co-pending and commonly-assigned patent application, which applications are incorporated by reference herein:

U.S. patent application Ser. No. 13/090,997, filed on Apr. 20, 2011, entitled "CUSTOMIZED BILLBOARD WEBSITE ADVERTISEMENTS", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, and GREG MCCARTHY, which application claims priority to U.S. Provisional Patent Application Ser. No. 61/326,544 filed on Apr. 21, 2010, entitled "CUSTOMIZED BILLBOARD WEBSITE ADVERTISEMENTS", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, and GREG MCCARTHY; and U.S. patent application Ser. No. 13/091,005 filed on Apr. 20, 2011, entitled "MEDIA ASSET/CONTENT SECURITY CONTROL AND MANAGEMENT SYSTEM", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA, which application claims priority to U.S. Provisional Patent Application Ser. No. 61/326,549 filed on Apr. 21, 2010, entitled "MEDIA ASSET/CONTENT SECURITY CONTROL AND MANAGEMENT SYSTEM", by ELAINE M. SPOONER, JOHN D. KOSCHEKA, MICHAEL S. BESSOLO, MARK L. SIMPSON, JEAN L. YUAN, J. CRAIG D. RUSSELL, CHRISTOPHER M. BETTES, GREG MCCARTHY, SRINIVAS KUNDULA, and VENKATA NAGARAJU MANTENA.

BACKGROUND OF THE INVENTION

1. Field of the Invention

The present invention relates generally to the delivery of media content, and in particular, to a method, apparatus, system, article of manufacture, and user interface for the digital distribution of all marketing assets, low-resolution screeners, and broadcast quality video.

2. Description of the Related Art

Many types and pieces of information or media content may be utilized as part of the broadcast, advertisement, and sale of such content. Content from various studios (e.g., FOX™) may include:

- Over 2,500 Feature Films; over 14,000 Television Series, Seasons and Episodes; and over 1,000 Specials, Movies of the Week and MiniSeries;
- Over 100,000 images: Production Stills, Logos, Artwork, Gallery and Episodic Photos;
- Over 12,000 Scripts and over 10,000 Music Cue Sheets;
- Over 7,300 trailers and other promotional videos;
- Over 2,500 episodes for screening;
- Over 9,300 broadcast quality files, representing over 700 episodes; and
- Over 1,000 broadcast quality promotional videos (Television spots, etc.).

Today's physical media-based distribution model is inefficient and subject to challenges including import-export delays, courier, flight or customs problems. In addition, the reliance on fuel-based logistics during product shipping is counter to television distribution and its licensees' carbon neutral operational goals. Finally, physical media-based distribution is expensive with dependencies on manufacturing, shipping and physical media management. For a better understanding of these problems a description of prior art media distribution models is useful.

Prior art techniques used to fulfill its customer's requests for advertising and publicity materials required the physical distribution of such materials on physical paper—e.g., slides and transparencies, ad-slicks (camera-ready advertisements of varying sizes that are used in print media such as newspapers and magazines), scripts and music cue sheets. Slides would be duplicated at a photo lab and scripts would be photocopied. The materials would then be boxed up and shipped out to customers such as international broadcasters. These boxes would often get held up at customs, or the materials would be misplaced by the customer—adding to the expense of both time and money.

To overcome some of the prior art problems, digital processes have been reshaping all aspects of the broadcast television industry. Product is now regularly digitally recorded, edited and distributed to audiences via server-based play out. This evolution may naturally extend to the content supply chain and distributor relationships whereby physical media and shipping will soon become obsolete means for content delivery. In this regard, websites have been developed where customers were able to download advertising and publicity materials needed whenever (and as often) as necessary. Instead of slides, customers downloaded JPGs; instead of paper scripts, downloadable PDFs were available. Written information like synopses, cast and crew biographies, awards, and press quotes were also available on such web sites (e.g., FOXFAST™).

Security mechanisms may also exist on such prior art web sites. Such security mechanisms included password-protection that was tied into a studio's television distribution sales system so customers were only given access to materials for the television series and films that the customer currently licensed from the particular studio. However, such a limited system would not allow the customer to view all of the assets available for the customer to license. In this regard, a television distribution sales group is continuously selling titles from a studio's entire catalog, and since customers can only see titles they already licensed in prior art websites, the need for an overall comprehensive catalog site was desirable.

To overcome such problems, a non-password protected catalog website was developed in the prior art to showcase all titles (e.g., features, television series, specials, movies of the week, mini-series, etc.) available from a particular entity. Such a prior art website provided the ability to search assets using a variety of criteria including actor, award, box office, genre, and synopsis key words (e.g. all titles about "baseball").

In addition to the above websites, a further website was developed in the prior art to allow customers to screen television shows and movies without waiting for a digital video disc (DVD) (and saving the costs of burning and shipping such discs as well). Such screening was viewed as a desirable pre-sales tool. Digital rights management (DRM) was used in such prior art websites to protect the content from unauthorized viewing and piracy.

However, for a media content owner to efficiently and easily deliver pre-sales and sold content to a customer while allowing a customer to easily and efficiently browse all content and receive such content was not provided by the above prior art systems. Instead, customers were forced to utilize multiple websites for different purposes and media content owners did not have the flexibility to easily manage, sample, and deliver such content to both prospective and actual customers. In addition, prior art systems failed to provide the ability to digitally deliver broadcast quality digital files. Instead the prior art required the duplication of a tape and the shipping of the tape overseas.

Thus, the prior art had many problems and deficiencies including:
  massive distribution costs to create and ship tapes;
  recurring and substantial sunk costs caused by the cost to manage physical media;
  product that can leak to the internet prior to a local market telecast;
  content leaks that can impact the perceived value of a product;
  accelerated demand to ship, schedule, and broadcast programs internationally on the heels of U.S. broadcasts; and
  greater attention to physically manage higher content volumes against increasingly intense deadlines based on the accelerated demand to air products.

Accordingly, what is needed is an online digital delivery system using a singular comprehensive easy-to-use website that provides the capability to: search a media content owner's film and television series catalog; access and download marketing and publicity assets; screen movies, episodes, and promotional videos; and deliver broadcast quality digital files. Thus, rather than duplicating a tape and shipping it overseas, it is desirable to provide a customer with the ability to download a file and broadcast the file directly out to their viewers. Further, it is desirable to quickly transition from physical tape delivery to digital delivery for both television series and feature films.

SUMMARY OF THE INVENTION

One or more embodiments of the invention provide a website that provides the capability to securely manage digital distribution of all marketing assets, low-resolution screeners, and broadcast quality video. Such embodiments provide a one-stop-shop, online portal designed to conveniently deliver, using house-file video standards, all assets a licensee may need to make purchase decisions, promote, market, and distribute a media content owner's product. Embodiments of the invention may include one or more of the following features:
  single login access to combined services for authorized broadcast licensees;
  delivery of non-video marketing assets in multiple formats;
  screening of all DRM protected video in international markets;
  digital delivery of broadcast quality masters to broadcast licensees;
  cross platform screening availability of DRM protected video; and
  narrow cast branding and marketing messaging.
Advantages/benefits of the invention may include:
  elimination of the distribution of physical media-based video elements;
  savings on tape manufacturing costs, protection against rising costs associated with HI-DEFINITION video distribution, and passing of the savings to customers by eliminating all tape servicing costs;
  securing of content using state-of-the-art encryption and digital rights management tools; and
  accelerated access to licensed products via online 24/7 on-demand delivery.

BRIEF DESCRIPTION OF THE DRAWINGS

Referring now to the drawings in which like reference numbers represent corresponding parts throughout:

FIG. 3 illustrates an advanced search graphical user interface presented to a customer in accordance with one or more embodiments of the invention;

FIG. 4 is a graphical user interface displaying search results in accordance with one or more embodiments of the invention;

FIG. 5 illustrates a graphical user interface displaying a detailed overview for a season title (i.e., season 8 of "24") that has been selected by the user in accordance with one or more embodiments of the invention;

FIG. 6 illustrates a graphical user interface of a title cart used in accordance with one or more embodiments of the invention;

FIG. 7 illustrates an asset cart graphical user interface displayed in accordance with one or more embodiments of the invention;

FIGS. 8A-8C illustrate the graphical user interface for defining the customization attributes for a user's home page in accordance with one or more embodiments of the invention;

FIG. 9 is a graphical user interface illustrating a screening room containing a playlist in accordance with one or more embodiments of the invention;

FIG. 10 illustrates a graphical user interface with the results from a search where the user has the option to download a title, play the title now (e.g., in the screening room), add the title to the playlist, or view the broadcast assets in accordance with one or more embodiments of the invention;

FIG. 11 is a graphical user interface showing recently viewed titles (i.e., titles viewed within the past seven days) color coded in accordance with one or more embodiments of the invention;

FIG. 12 illustrates a graphical user interface of the title detail summary screen in accordance with one or more embodiments of the invention;

FIG. 16 illustrates the logical flow for delivering media content in accordance with one or more embodiments of the invention.

DETAILED DESCRIPTION OF THE PREFERRED EMBODIMENTS

Figure 1:
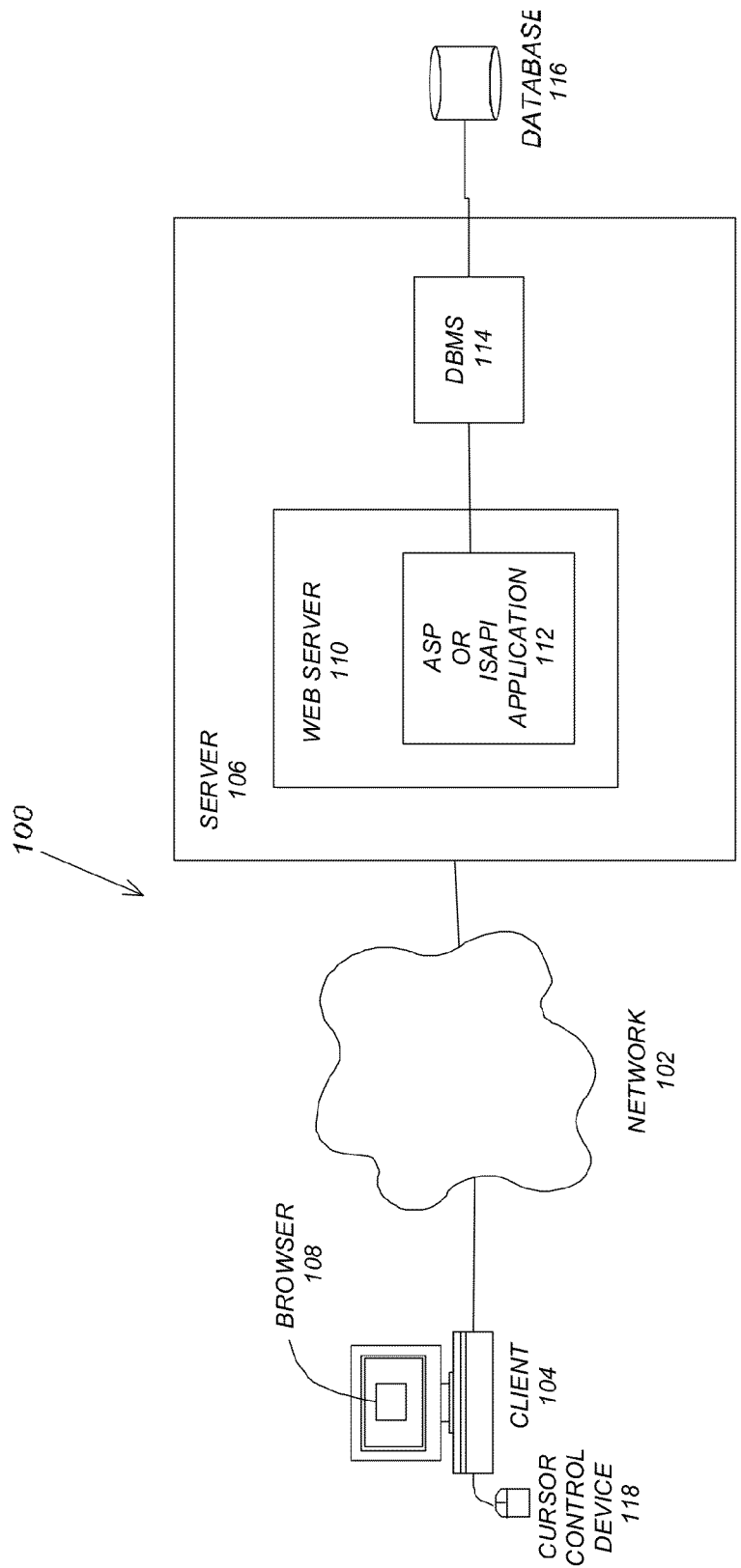
FIG. 1 schematically illustrates a hardware and software environment in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for a system, website/application and user interface that enables a user to view a product catalog and marketing assets, while also providing the ability to screen and download broadcast quality media content. The website/application is an integral part of a suite of fully-integrated systems designed to securely manage the worldwide digital distribution of low-resolution screeners and broadcast quality video for business to business (B2B) partners. The digital delivery pipeline provides a one-stop-shop, online portal that conveniently delivers all assets a licensee may need to make purchase decisions, promote, market, and distribute the product of a media content owner. Such media content includes, but is not limited to, free, pay, pay-per-view (PPV), video-on-demand (VOD), and electronic sell through (EST) customers.

Embodiments of the invention may eliminate the distribution of all DVD screeners and broadcast video elements, reduce annual tape manufacturing costs, protect against rising costs associated with hi-definition video distribution, and share savings with customers, secure content using state-of-the-art encryption and digital rights management tools, and speed access to licensed product via online 24/7 on-demand delivery.

Key Definitions

The following terms are used throughout this application document. When used herein, the terms are defined as follows:

Broadcast Video—includes any video delivered to a licensee that is ultimately intended for broadcast or distribution to viewers or consumers of a specific program service. Broadcast Video includes, but is not limited to, promotional content, Electronic Press Kits and full-length licensed content (i.e., features, television episodes, specials, etc.).

"Current" Product—for television programming. A "Current" Product is defined as any episodic network television series made available within 24 months of its original U.S. telecast. For feature releases, a "Current" Product is defined as any feature film which is in its initial theatrical run for any specific media.

Library Product—any product that is not a Current Product.

Preview Video—includes any video not intended for distribution to or viewing by consumers (excluding certain promotional content that may be tagged for web-use). Preview Video is generally used for making product acquisition or scheduling decisions, press distribution, language localization and other pre-broadcast planning purposes.

Quick Delivery (QD) is a television distribution descriptor for Broadcast Video of television product that is mastered with full-mix English stereo audio only. QD elements do not include separate music and effects tracks or textless video backgrounds.

Final International Master (FIM) is a descriptor for Broadcast Video of television product that is mastered with full-mix English stereo audio, stereo music and effects tracks and textless video backgrounds. FIM elements provide the necessary components to create final dubbed language versions for a program.

Standardized Delivery Formats

Both preview and broadcast video may be provided in various standardized formats in accordance with embodiments of the invention.

Preview Video may be made available as streaming WINDOWS MEDIA VIDEO™ MPEG-2 files encoded at 750 Kbps with a 640×480 screen resolution. Preview Video streaming may require a PC or Mac computer with Internet connectivity. Users may have the option to select true streaming or HTTP (hypertext transfer protocol) progressive download for slower connections.

Broadcast Video files may be available in Standard-Definition (SD) and High-Definition formats (HD). Access to HD video may only be authorized if HD rights are contractually permitted (see detailed description below).

Standard-Definition Broadcast Video may be encoded as SMPTE 356 M D10 (aka IMX) 4:2:2 I-Frame only MPEG-2 at 50 Mbps available in both 25 and 30 fps. Standard-Definition files support up to 8 channels of AES3 audio wrapped in an MXF container. SD video content is provided in both the 525 and 625 video formats.

High-Definition Broadcast Video may be encoded as XDCAM HD 422 (1920×1080 MXF) CBR 50 Mbps Long GoP 4:2:2 Profile and High Level files including up to 8 channels of AES3 audio. Frame rates include 59.94I or 50I.

Standard and High-Definition video for current season television products may be available in 4×3 and 16×9 aspect ratios. For current features and library product, video may be provided in other aspect ratios as available. Standard distribution video formats may include bars, tones and textless main and end title segments.

Broadcast Video files with like frame-rates (i.e., 25 fps) are frame accurate. MXF wrappers currently provide only re-embedded time-code that can also be found in a Broadcast Video files' video stream.

The following table summarizes the broadcast video files that may be supported in accordance with embodiments of the invention. However, while not specifically set forth below, additional files may also be supported. Further, for detailed descriptions of the terms used herein, please see the detailed description below.

| Standard | Format | Bit Rate | Aspect Ratio | Frame Rate | Audio |
| --- | --- | --- | --- | --- | --- |
| HD | XDCAM HD 422 | 50 mbps | 16 × 9 | 25 fps | FIM with m&e/ QD without m&e |

-continued

| Standard | Format | Bit Rate | Aspect Ratio | Frame Rate | Audio |
|---|---|---|---|---|---|
| HD | XDCAM HD 422 | 50 mbps | 16 × 9 | 30 fps | FIM with m&e/ QD without m&e |
| SD | MPEG-2 IMX | 50 mbps | 16 × 9 | 25 fps | FIM with m&e/ QD without m&e |
| SD | MPEG-2 IMX | 50 mbps | 4 × 3 | 25 fps | FIM with m&e/ QD without m&e |
| SD | MPEG-2 IMX | 50 mbps | 4 × 3 | 30 fps | FIM with m&e/ QD without m&e |

Digital delivery of additional broadcast audio files may be supported using the .wav format. 5.1 full mix English audio, 5.1 music and effects (m&e) and laugh tracks are additional broadcast audio files that may be supplied (as available). Each channel for such audio content is delivered as discrete .wav audio files. Additional formats, including alternative aspect ratios, may also be available.

Hardware Environment

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs (local area networks), WANs (wide area networks), SNA (systems network architecture) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Network 102 may utilize ethernet, coaxial cable, wireless communications, radio frequency (RF), etc. to connect and provide the communication between clients 104 and servers 106. Clients 104 may execute a client application or web browser 108 and communicate with server computers 106 executing web servers 110. Such a web browser 108 is typically a program such as MICROSOFT INTERNET EXPLORER™, MOZILLA FIREFOX™, OPERA™, or APPLE SAFARI™. Further, the software executing on clients 104 may be downloaded from server computer 106 to client computers 104 and installed as a plug in or ACTIVEX™ control of a web browser. Accordingly, clients 104 may utilize ACTIVEX™ components/component object model (COM) or distributed COM (DCOM) components to provide a user interface on a display of client 104. The web server 110 is typically a program such as MICROSOFT'S INTERNET INFORMATION SERVER™.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize MICROSOFT'S™ Transaction Server (MTS) to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

In one embodiment, instructions implementing the browser 108 or other applications for either client 104 or server 106 are tangibly embodied in a computer-readable medium, e.g., data storage device, which could include one or more fixed or removable data storage devices, such as a zip drive, floppy disc drive, hard drive, CD-ROM drive, tape drive, etc. Further, such applications are comprised of computer program instructions which, when accessed, read and executed by the client 104 or server 106 causes such computers 104-106 to perform the steps necessary to implement and/or use the present invention or to load the program of instructions into a memory, thus creating a special purpose data structure causing the computer to operate as a specially programmed computer executing the method steps described herein. Such applications may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media.

Although the term "user computer", "client computer", and/or "server computer" is referred to herein, it is understood that such computers 104-106 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 104-106.

Figure 2:
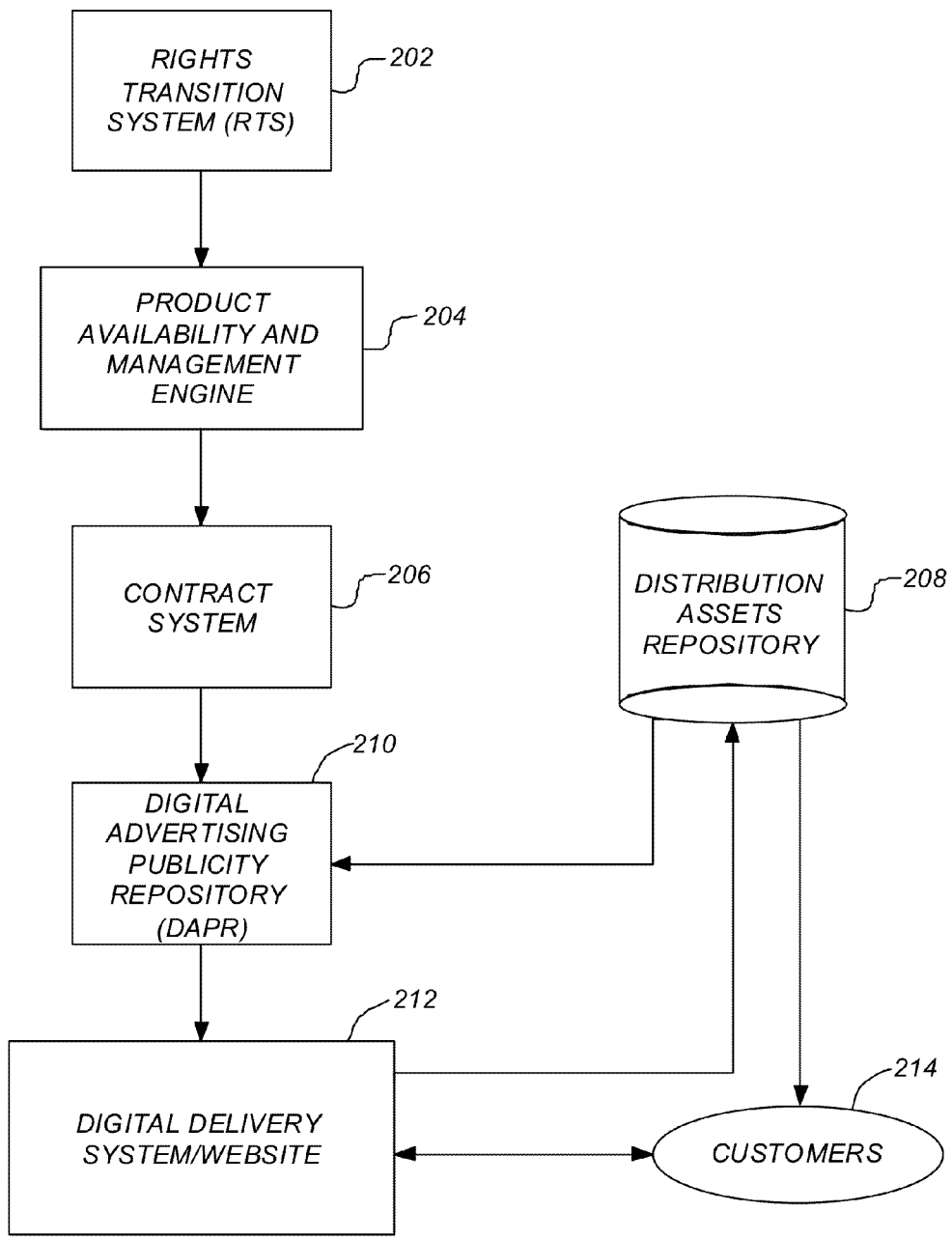
FIG. 2 illustrates an integrated digital distribution system suite that enables such management and distribution in accordance with one or more embodiments of the invention.

Using the network architecture of FIG. 1, embodiments of the invention may further integrate multiple different systems to provide for the secure management of the digital distribution of media content. FIG. 2 illustrates an integrated digital distribution system suite that enables such management and distribution. Each of the systems and components of FIG. 2 may be implemented by either a client computer 104 or server computer 106 to provide the features described herein.

A custom built repository, referred to as a rights transition system (RTS) 202) manages content and distribution rights. RTS 202 is the foundation of product status feeding downstream systems with information related to distribution rights, media, territory, language, and music rights. In other words, the RTS 202 identifies the ownership rights (i.e., distribution and licensed rights) that are available. Such information includes what one is allowed to do with the product (e.g., if one has any rights to give away/license with respect to a particular product).

The information in RTS 202 may be transmitted or retrieved using a product availability and management engine 204. In other words, product availability and management engine 204 provides the ability to query RTS 202 to retrieve details regarding sales/licensing information. For example, engine 204 may provide information regarding what products are available to sell/license, where the product may be sold/licensed, what media may be sold/licensed, when the product may be sold/licensed, and how long the product may be sold/licensed (e.g., the availability date of every film before 1975 in German). Accordingly, engine 204 may also be known as a recording and reporting engine that provides the ability to query RTS 202 for data to determine available products/content.

Contract system 206 retrieves (or is transmitted) information from product availability and management engine 204. Contract system 206 records details regarding the specific completed transactions/licenses with customers. In other words, the licensed rights such as an identification of a particular product, the time period of the license, and the specific customers part of that license are recorded within contract system 206. For example, all licenses for a television program such as GLEE™ may be recorded within contract system 206. For all such licenses, a user may be given access based thereon. When a new episode of GLEE™ is uploaded, access may be automatically generated based on such recorded licenses (without the need to resubmit or update the license provisions recorded within contract system 206). In addition, any billing to customers for such licensed rights may occur within contract system 206.

The distribution assets repository 208 (also known as ESPIRIT™) is a custom built system designed as a studio's repository for distribution assets including full length broadcast video, promotional material, and marketing material. In other words, repository 208 provides a distribution warehouse for product deliverables (i.e., digital downloads for a product). File acceleration software may be used within repository 208 to expedite the delivery of products to customers. Alternatively, broadcast video assets may be stored in repository 208 while marketing and screener assets may be stored in a repository within the digital advertising publicity repository (DAPR) 210.

The DAPR 210 is a custom application that feeds (to customers) contractual licensing and product information from upstream sales applications. DAPR 210 is the "air traffic control" mechanism of the digital delivery initiative described herein and allows users/administrators to define/set conditional-based access policies for all file-based distribution assets. Security controls for products/assets may be further established/defined/modified in DAPR 210. In other words, based on the licensed rights from upstream applications 202-208, DAPR 210 provides an administrator with the capability to determine how customers 214 or users can view and select products/content from a digital delivery system/website 212. Information from the upstream applications 202-208 may be pushed into the DAPR system 210 on a regular/semi-regular basis to ensure appropriate security access controls are being utilized. While the different licensed rights information is determined in systems 202-206, the actual downloadable assets are stored in repository 208 and DAPR 210 controls the security mechanisms (i.e., who has appropriate access/download privileges) to determine whether a customer 214 on a delivery system/website 212 can download the assets in repository 208.

Digital delivery system/website 212 is a business-to-business online portal designed to deliver all file-based assets connected to the sales, promotion and broadcast of television distribution licensed properties. In other words, the website 212 is the storefront for the electronic delivery of professional grade product deliverables.

Software Embodiment Overview

Through the above described systems and components of FIG. 1 and FIG. 2, a digital delivery system 212 (that may include a website or a network accessible application) provides a secure, encrypted and easy to use file-based delivery solution to receive video assets. The system 212 provides a central access hub for licensees to source all video assets required for content acquisition decisions, promotions, and broadcast. In this regard, preview video streamed through the system 212 can replace DVD screeners while broadcast video accessed via system 212 replaces videotape.

The system 212 provides/combines three different sites/functions into a single system/application: (1) a public site catalog; (2) marketing assets system; and (3) a screening and download system. An overview of each function will be described followed by detailed descriptions of the user interface features of embodiments of the invention.

The public site catalog provides a non-password protected area for pre-sales information to be searched. All content available can be viewed to assist a customer in evaluating content as part of the purchase decision. As part of the catalog, digital posters may be displayed with content information. By hovering over a poster with a cursor, an enlarged view may be displayed, that upon activation, provides an overview of the product/property associated with the poster that may include cast or other publicly available information. Low resolution photographs, public trailers, and other publicly accessible material may be available in this portion of the system 212.

The marketing assets system is available to authorized users via login and password. The information in the marketing assets system provides information based on the particular license associated with the authorized user. In other words, the assets that can be viewed may reflect the licensed rights from contract system 206 based on the security parameters set forth in DAPR 210. Accordingly, when an asset has been licensed, the content owner (e.g., sales representative from the content owner) enters the license terms into the back-end system (e.g., contract system 206), and such assets are reflected in the logged-in area of system 212.

The screening and download system may be viewed by customers 214 once logged in (e.g., via username and password). In this system, the authorized customer 214 can view items available for download and screening. The screening capability allows users 214 to preview video content using a graphically rich user interface as described herein. Further, the screening capabilities may be configured for multi-party viewing, via a television, or through a mobile device. Such screening and downloading capabilities may include assets such as full length video, audio elements, photography, scripts, music cue sheets, on-air promos, etc. In addition to traditional marketing assets, authorized customers 214 may have the ability to retrieve/download intellectual property (including a technical data transfer) associated with an asset/show/concept. Such distribution is referred to as a format title asset distribution. For example, the idea/concept for a reality show (e.g., Beauty and the Geek™) may be sold to a customer 214 in a different country and the screening/download system provides the ability to transfer the concepts, set design, blue prints, etc. for the idea/concept to the authorized customer 214.

In addition, the screening and download area provides a unique user interface, indicating content available for download and screening, for every authorized customer 214 based on what that customer 214 has licensed. Further, such downloadable content may be DRM-protected.

User Interface

To provide the digital delivery system 212, various tools and features may be utilized to provide a unique experience for each party accessing the system 212. The unique and novel user interface provides and enables unique and novel functionality to customers 214. As described above, such an interface not only provides the ability to preview video content, but also organizes the video assets to enable convenient access by navigating to a specific program title wherein each title may have its own video asset collection allowing licensees (e.g., customers 214) to easily locate, organize, and stream content.

Tiered Series/Season/Episode Product Navigation

Figure 3:
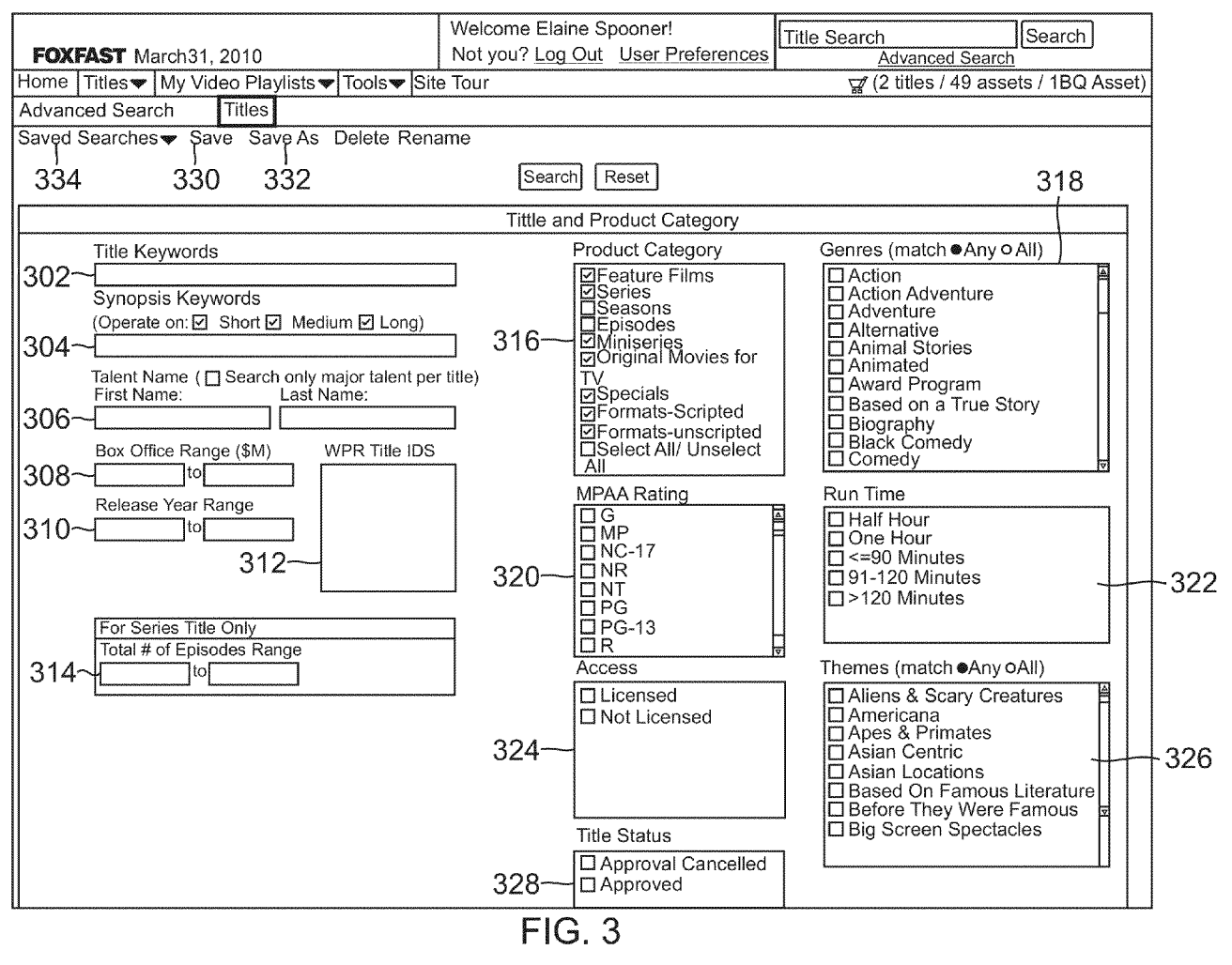

Authorized customers 214 are provided with the ability to search products/assets available to the customer 214. FIG. 3 illustrates an advanced search graphical user interface presented to a customer in accordance with one or more embodiments of the invention. Various search fields are presented to the customer. The user may enter text to search in the title keywords 302 or synopsis keywords area 304. Alternatively, customers 214 may search based on name 306, box office range 308, release year range 310, WPR (world product registry) title 312, or the total number of episodes range 314.

In addition to the text based fields, customers 214 may search or filter their search based on a variety of defined categories using radio buttons/check boxes such as product category 316, genre 318, MPAA rating 320, run time 322, access 324, theme 326, and/or title status 328. One may note that other search fields may be included in the advanced search options and the selection method (e.g., radio button, drop drown list, etc.) is not limited to those described herein.

Figure 4:
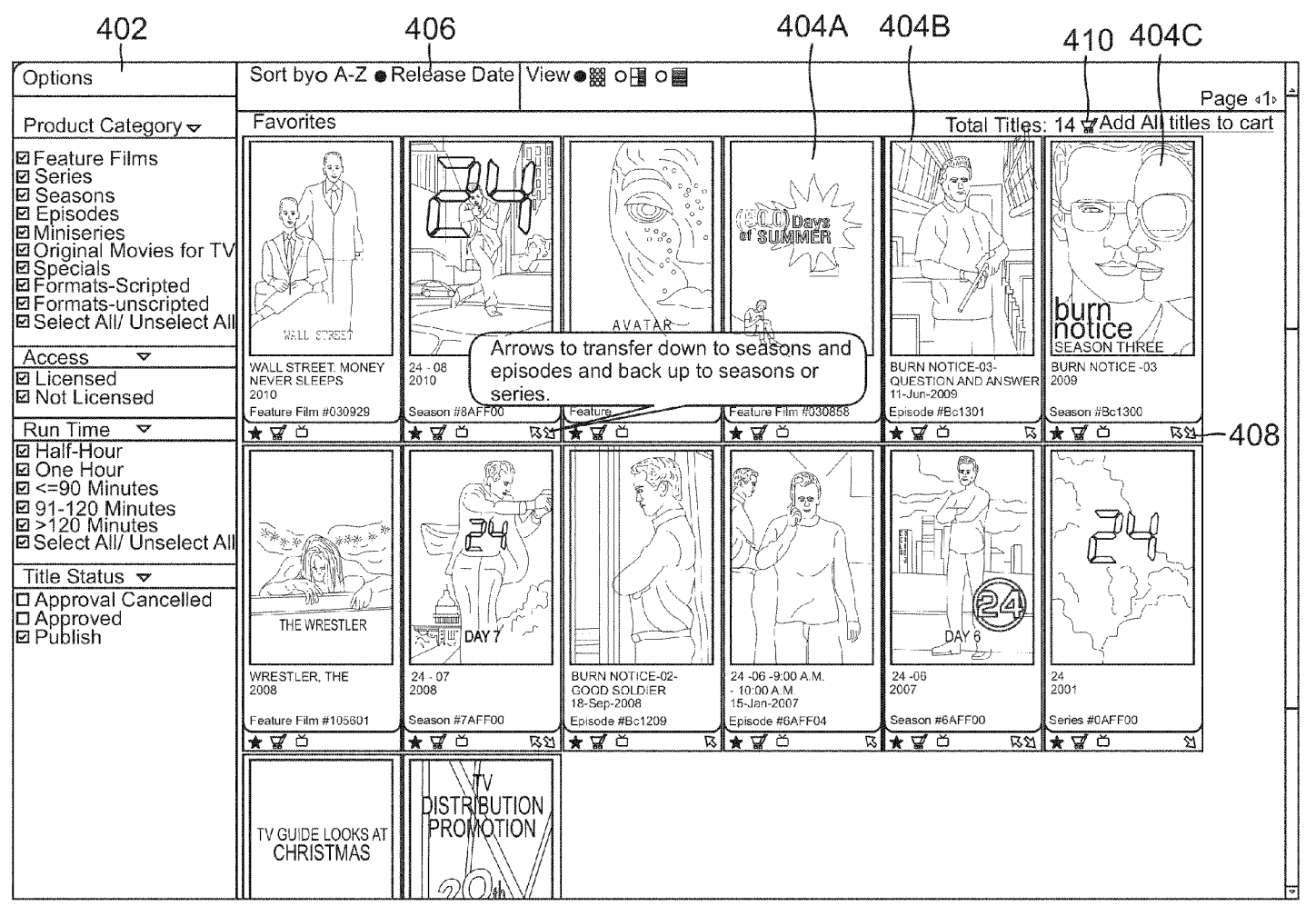

Once the customer 214 has conducted the search as desired, the results may be displayed in a variety of formats. FIG. 4 is a graphical user interface displaying search results in accordance with one or more embodiments of the invention. The bar 402 on the left of the display area indicates the various filters that are used to display the results. Customers 214 can check or uncheck the desired options to modify the filters used. In FIG. 4, check marks appear across all of the product categories, both licensed and unlicensed assets, all run times, and only published titles.

The results 404 are illustrated sorted by release date 406. As illustrated, different posters/title rep graphics 404 are displayed based on the query results. Each poster 404 represents a title. The posters may further provide information at different levels. For example, title 404A is for a feature film, title 404B is for an individual episode of "Burn Notice" (i.e., episode 3 entitled "Question and Answer") while title 404C is for the entire 2009 season of "Burn Notice". Thus, customers 214 may select a desired title 404 at whatever desired level (i.e., series, season, episode) to view additional information. The arrows 408 below the corner of each title poster provides the ability to drill down/up to a different level. Thus, by clicking the up/left arrow 408 on episode title 404B, the user can view more details regarding the season of Burn Notice. Similarly, by clicking the up/left arrow in season title 404C, the user can view further details regarding the Burn Notice series. The right/down arrow allows the user to navigate and view details at a more explicit level (e.g., series season→episode).

Figure 5:
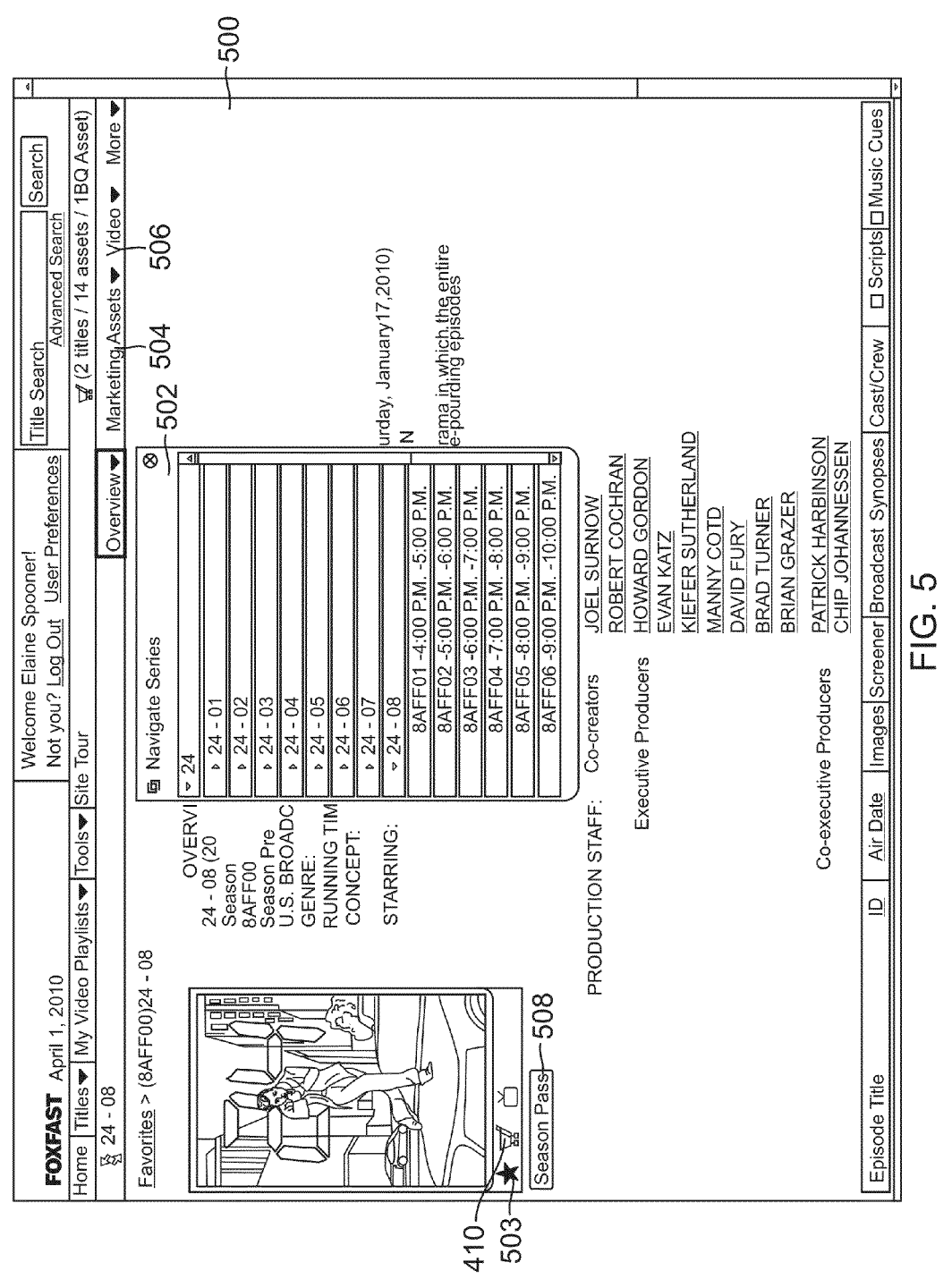

Alternatively, the user can select the poster 404 itself and view details regarding the selected poster 404. FIG. 5 illustrates a graphical user interface displaying a detailed overview for a season title (i.e., season 8 of "24") that has been selected by the user in accordance with one or more embodiments of the invention. Once the detailed overview screen 500 has been displayed, the user 214 can opt to navigate the entire series. Accordingly, in FIG. 5, while the user originally selected the poster corresponding to the $8^{th}$ season of "24; the user has opted to navigate the "24" series with a series navigation pop-up window 502. The individual episodes in season 8 are also displayed in the series navigation window 502. By selecting the arrows within dialog box 502, the user can expand or contract the individual seasons listed therein. By selecting the star icon 503, the title can be added to a "favorites" list that can be viewed as a group by the user.

In addition to overview 500, the customer 214 may also elect to view the marketing assets 504, or video 506 (e.g., to download or screen licensed titles).

The user may further elect to put a particular title into a cart by selecting the cart icon 410 in FIG. 4 or FIG. 5. The cart icon 410 may prompt the user to utilize either a title cart or an asset cart. Alternatively, when in the overview window 500, titles may be added to the title cart and while in the marketing assets window 504, marketing assets may be placed into the asset cart.

The title cart provides the ability to build a list of titles that may then be used as desired. For example, a sales representative may build a title list as a proposed package to sell to customers 214. Further, once the customer 214 navigates to the title cart, availability for the titles placed therein can be determined. For example, only those titles licensed by the particular logged-in customer 214 may appear in the title cart.

FIG. 6 illustrates a graphical user interface of a title cart used in accordance with one or more embodiments of the invention. Each row in the title cart corresponds to a title placed into the title cart. In FIG. 6, season 2 of the "Burn Notice" as well as the particular episode "Turn and Burn" (from season 2) have been placed into the title cart and are viewable in separate rows. Color coding of a particular column (or whole column) or row may indicate the availability of the title for screening/download. For example, column 600 or the listing in the title cart of FIG. 6 may be color coded such that titles with a gray background indicates licensed titles, an orange background indicates "In The Spotlight" titles (see more details below), a blue background indicates access coming soon, and a white background indicates non-licensed titles. The titles in FIG. 6 are listed with white backgrounds and hence are non licensed. Different options/colors may be utilized as desired.

Figure 7:
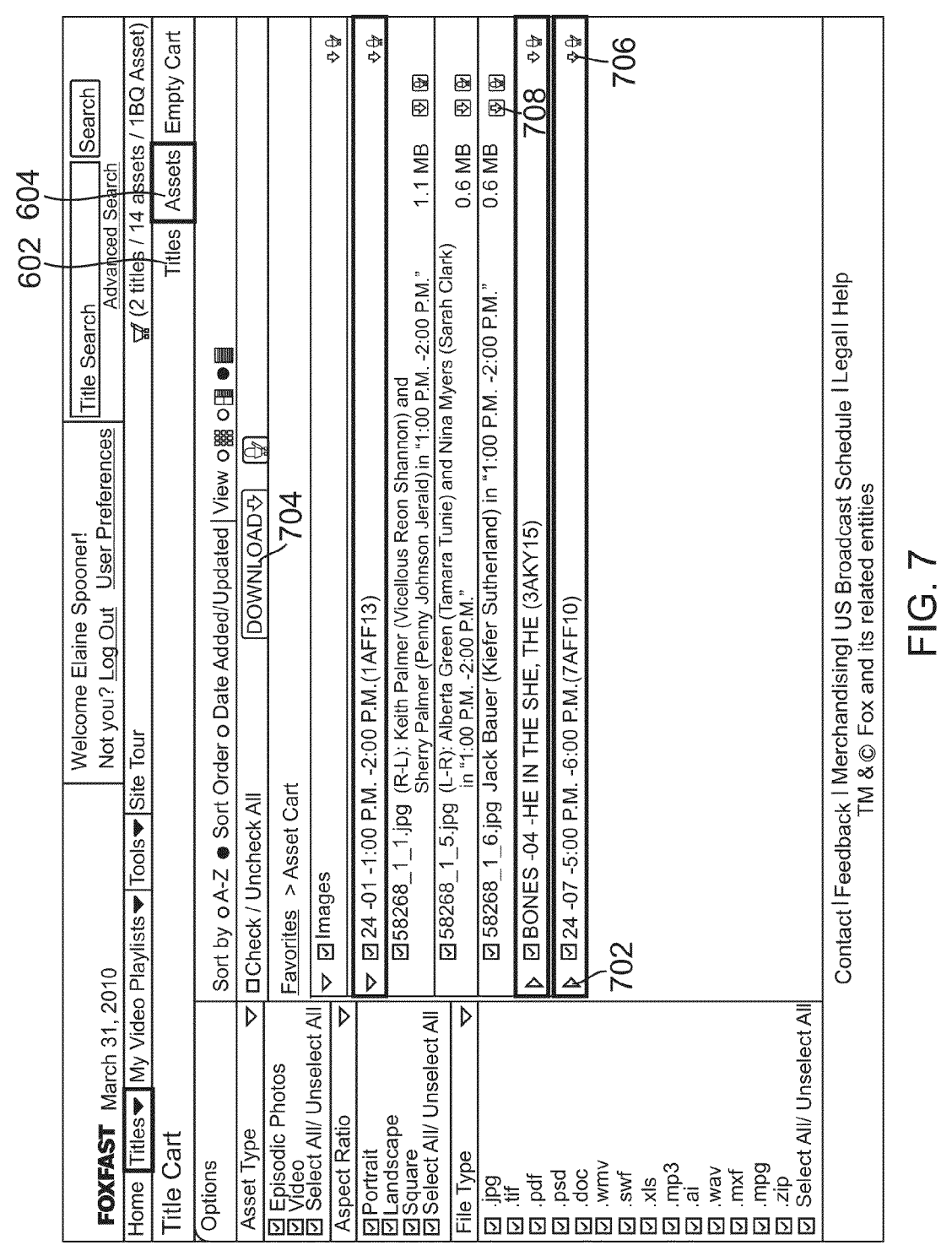

As illustrated in FIGS. 6 and 7, the user can easily switch between the title and asset carts by selecting the appropriate tabs/buttons 602 and 604. FIG. 7 illustrates an asset cart graphical user interface displayed in accordance with one or more embodiments of the invention. In the asset cart, users can organize and manage assets such as photographs, scripts, trailers, etc. that may be available for download. In FIG. 7, the first season, episode "1:00 P.M.-2:00 P.M." of "24" has been placed in the asset cart and three ".jpg" images are available for download. Additionally, episodes of "Bones" and another episode of "24" have been placed into the asset cart. The expansion arrows/buttons 702 can be used to view the assets available for any particular title in the asset cart. In this regard, the arrows 702 may be used to show/hide assets for each grouping (episode). The download button 704 can be selected to download all checked assets in the broadcast quality asset cart. The download arrow 706 can be selected to download all checked assets in a group while download arrow 708 can be selected to download only that particular asset in the corresponding row.

Parent-Level Asset Grouping/Packaging Including Broadcast Video

Returning again to FIG. 5, when a user 214 hovers or activates a poster, a pop-up window such as window 502 displays the different assets/titles that can be accessed, downloaded, etc. The different formats for which the asset/title can be provided to the customer 214 may also be displayed and grouped based on the particular asset/title. For example, videos (e.g., PAL, HD, etc.) may be grouped by asset such that all videos of a particular format that can be downloaded, screened, broadcast, etc., may be found within the listing for a particular asset/title.

Broadcast Video for a current television product may include two delivery options: Quick Delivery and Final International Master (FIM) Broadcast Video.

Quick Delivery (QD) is a television distribution descriptor for Broadcast Video of a television product that is mastered with full-mix English stereo audio only. QD elements do not include separate music and effects tracks or textless video backgrounds. QD elements are basically clones of U.S. Network broadcast masters. Non-English licensees may be unable to create final dubbed language versions of a program from QD elements, but the creation of subtitled versions of a product may be possible.

QD elements for current television series products may be made available on the day of U.S. broadcast if a licensee's request is pre-approved. Licensees accessing file delivery for these episodes may have the opportunity to schedule broadcast of content immediately following its U.S. broadcast subject to contractual terms.

Final International Master (FIM) is a descriptor for Broadcast Video of television product that is mastered with full-mix English stereo audio, stereo music and effects tracks and textless video backgrounds. FIM elements provide the necessary components to create final dubbed language versions for a program. FIM elements for current television series product may be made available for file download 20-30 days after its U.S. broadcast subject to contractual terms of license agreements. Alternatively, a mastering process may enable the FIM file to be available slightly before a U.S. broadcast for some titles. Such titles may not have a QD asset.

User-Level Home Page Anchoring

Figure 8A:

When a customer 214 logs onto the system 212, the default or homepage presented to the user may be customized. Such customization may be established by the user 214 or by an administrator (depending on the implementation utilized). FIGS. 8A-8C illustrate the graphical user interface for defining the customization attributes for a user's 214 home page in accordance with one or more embodiments of the invention.

In FIG. 8A, the user's 214 password can be changed. Further, the default sorting order for the titles and assets may be established. In this regard, the default sort option may be set to A to Z, release date, or access date. Further, the default view options may be defined as small thumbnail, large thumbnail, or list view. The title list access options may also be defined to either include or exclude "licensed" and "not licensed" from the title list.

In FIG. 8B, title list status options (approved or approval cancelled) can be defined. Further, the default homepage option allows the customer 214 to change what titles are seen on the default homepage. It may be easier to work with only the titles the customer 214 has under license. However, the customer 214 can change the settings to view all titles, titles in the user's playlist, new titles, favorite titles, or saved searches (e.g., using a drop down for the search selection). The default asset view allows the customer 214 to group or ungroup assets. Video streaming settings are for streaming preview video only and may be defined for a fast internet connection (play immediately), or slow internet connection (wait before play).

In FIG. 8C, default product category filter options (e.g., feature films, series, seasons, episodes, miniseries, etc.) may be specified. Such settings allow the customer 214 to include or exclude product categories from showing up in the customer's "my title list".

In addition to FIGS. 8A-8C, additional user preferences may include a listing of season passes for a particular user (i.e., those titles for which the user has currently licensed the listed season), and/or broadcast quality download options may be specified (e.g., to opt out of e-mail notifications stating when assets have been authorized, to automatically add broadcast video to a broadcast video asset cart, and/or by default, to include an identified list of broadcast quality specs in a broadcast quality list [e.g., HD 1080I 30, HD 1080I 25, SD PAL 4×3, SD PAL 16×9, etc.]). The user 214 can then save all the settings by selecting the "save changes" icon at the bottom of FIG. 8C.

In view of FIGS. 8A-8C, users may have the ability to assign different settings for playlists, licensed titles, etc. to utilize such settings as default options.

Saved Media Searches

Users 214 may further have the option to save searches/queries for content that they have performed. Referring again to FIG. 3, as described above, the user may define all of the query options in fields 302-328. Using buttons/icons 330 and 332, such searches can be saved for later use/retrieval. Users may further assign a custom identifier (e.g., text name) to any search. Using button/icon 334, the user can easily select any searches previously saved (e.g., by selecting the dropdown arrow).

Once a search has been saved, the results are dynamically updated based on the saved search. For example, if the search criteria specify an actor's name, when the search is conducted, any new titles with that actor will appear in the query results. Further, if the saved search is used as a default home page, the results are automatically and dynamically updated based on the most recent list of assets/titles available. In addition, if the user does not have a license, and later obtains a license to a particular product, the results of the query will reflect those titles that are actually licensed and will update accordingly. Further, users may also have the capability to search for particular assets or types of assets (e.g., based on title, actors, etc.) rather than being limited to just searching video titles.

Online Subscription Season Pass Preview Video Access

Individualized playlists may also exist for customers 214. Assets/titles can be added to a playlist if screening capability exists for that title. With respect to the playlist, a customer 214 may have access to an entire season and can request an entire season worth of video to be added to their playlist at a single time. To add such material to a playlist, the customer 214 needs a subscription to a particular season and may simply click the season pass button/link/icon below a poster billboard (e.g., button 508 of FIG. 5).

FIG. 9 is a graphical user interface illustrating a screening room containing a playlist in accordance with one or more embodiments of the invention. In FIG. 9, the "My Season Pass" tab has been selected and all episodes/titles/assets that are part of the logged-in customer's season passes are displayed within the season pass area. Thus, if a user has licensed certain titles and has added such titles to their season pass, all available episodes may be displayed in the screening room of FIG. 9. Accordingly, rather than conducting a search using the graphical user interface of FIG. 5, the customer 214 can simply move to the screening room to view all available episodes that the customer has licensed from the media content owner. Alternatively, as described above, the season passes, episodes within a season pass, etc. may be part of the advanced search options of FIG. 5.

Figure 10:
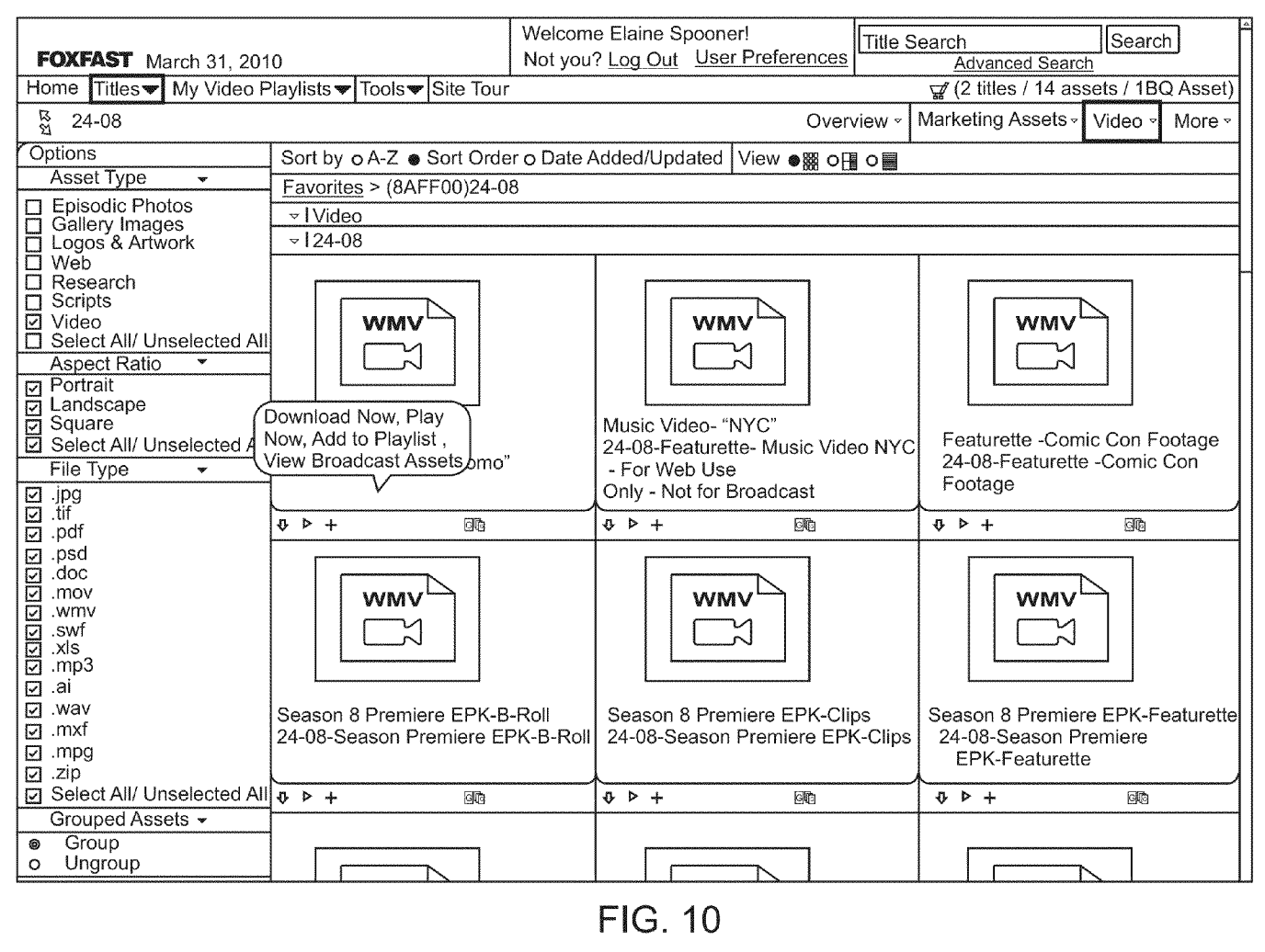

Further, such search options may also include the ability to add search results (if available and authorized) to a user's playlist. In this regard, a search results screen may also provide such capability. For example, FIG. 10 illustrates a graphical user interface with the results from a search where the user has the option to download a title, play the title now (e.g., in the screening room), add the title to the playlist, or view the broadcast assets in accordance with one or more embodiments of the invention. The arrows at the bottom of each asset poster (i.e., the sideways arrow) allow the user 214 to show/hide assets. The download button (i.e., the downward pointing arrow) allows the user 214 to download the asset.

Figure 11:
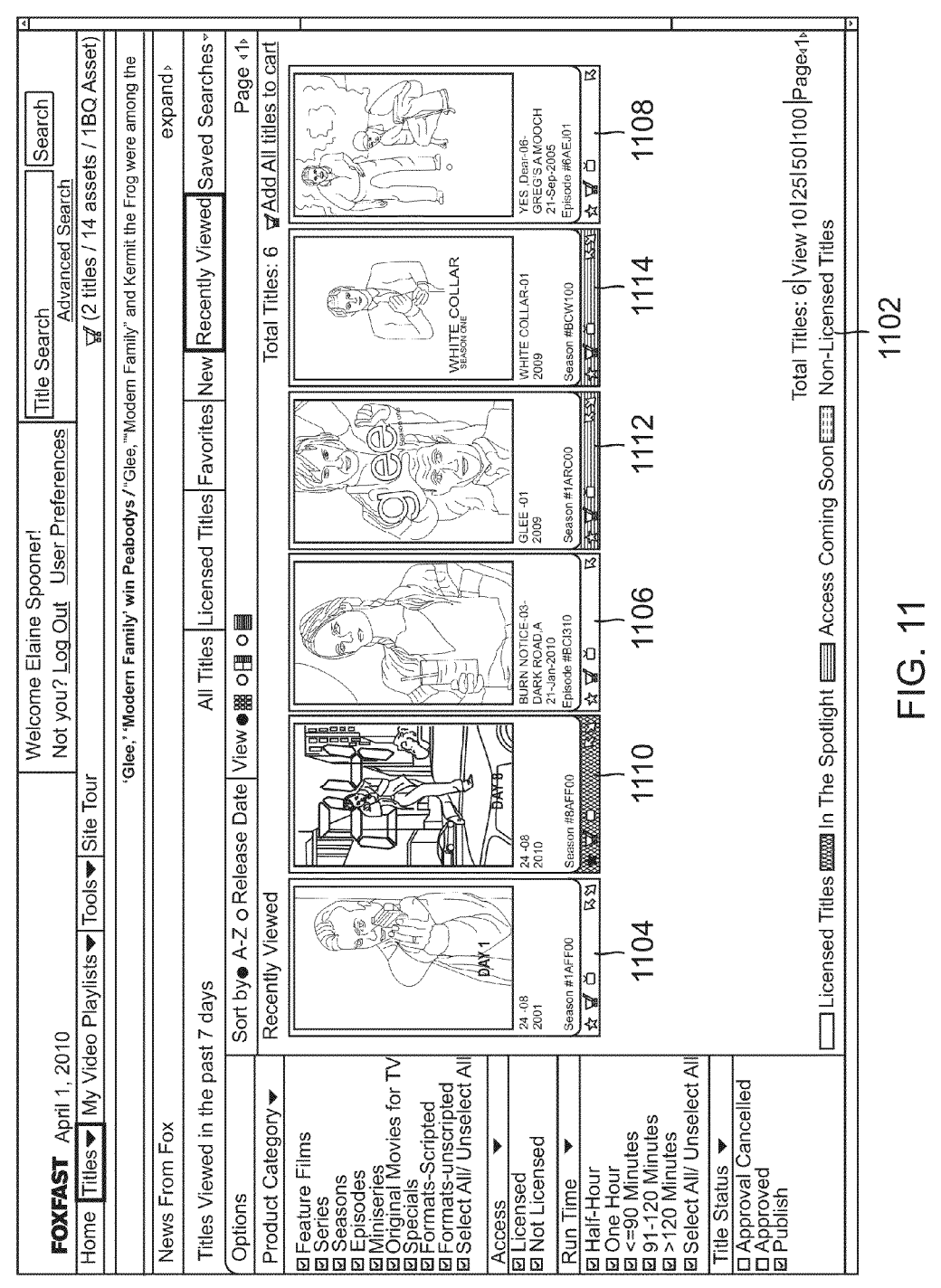

Color-Coded On-Screen Visual Title Detail Summary of Available Asset Collections As described above, FIG. 4 illustrates the results of conducting a search. In one or more embodiments the results or the view of titles/assets may be color-coded depending on what the customer 214 is able to view. FIG. 11 is a graphical user interface showing recently viewed titles (i.e., titles viewed within the past seven days) color coded in accordance with one or more embodiments of the invention. While recently viewed titles are displayed, the user can also select all titles, licensed titles, favorites, new and saved searches (via tabs at the top of the page) to create a new list of all titles in the group. In addition, the user can filter the displayed results (e.g., the recently viewed titles) using the check boxes in the options tab on the left side of the page (e.g., filter by product category, access, run time, and/or title status). As indicated in the legend 1102 at the bottom of the screen, the same color/patterns may be used as those discussed above with respect to FIG. 6—gray represents licensed titles (posters 1104, 1106, and 1108), orange represents spotlight titles (poster 1110), blue represents titles with access coming soon (poster 1112 and 1114), and white represents non-licensed titles (no poster shown). In addition, a light blue color may indicate a title has been licensed but the license period has not yet started. Additional colors may be used to represent different states for the titles/assets. The different color is reflected in the black and white drawing of FIG. 11 by the shading/patterns at the bottom of each poster illustrated and may further include an outline of the poster.

Figure 12:
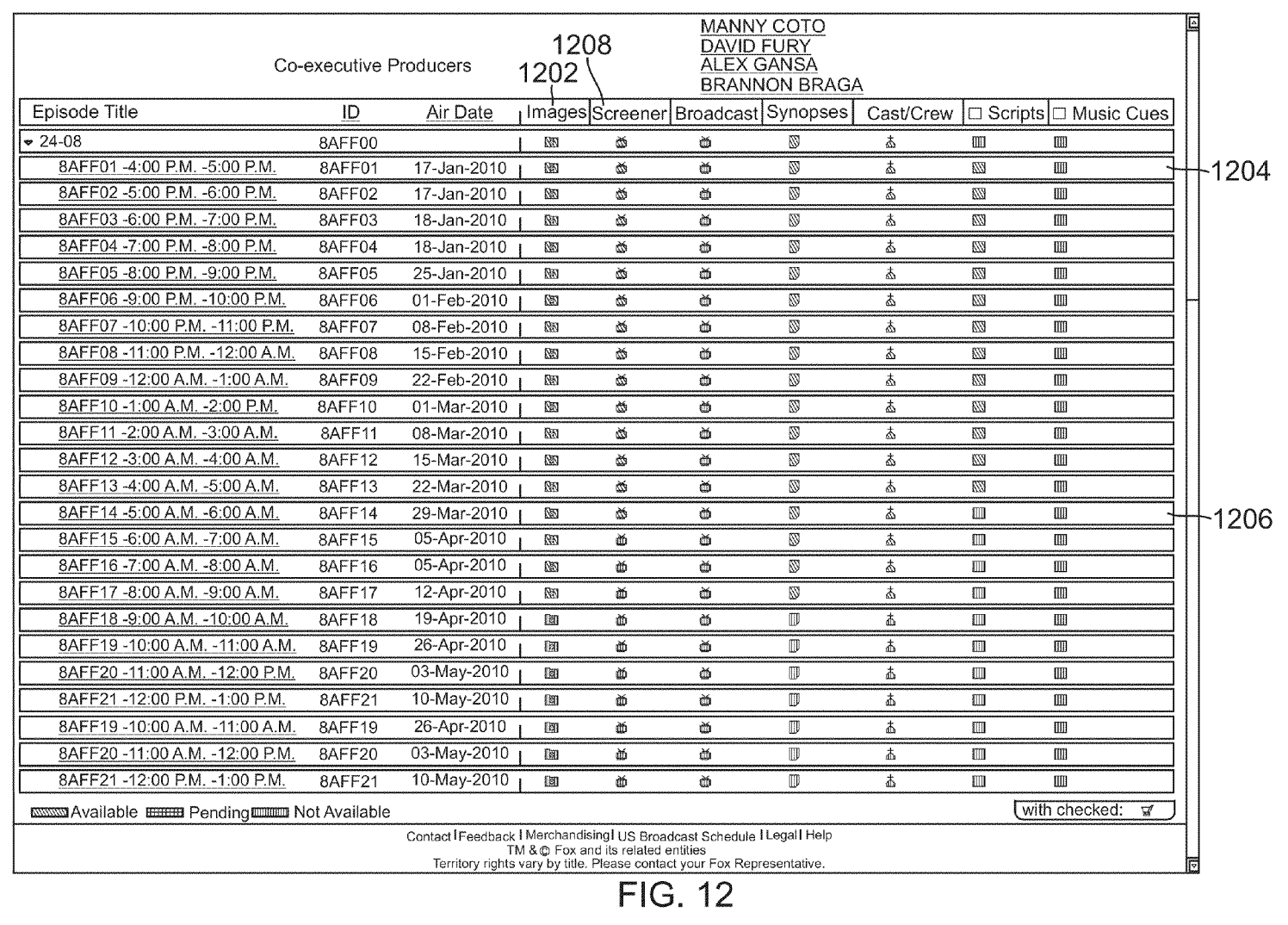

Additionally, in FIG. 11, a user 214 may search for particular titles by entering text in the title search field 1116. While entering text, a list of potential titles may populate in a drop down window that is displayed. Thereafter, the user 214 can click on an image of the desired match (e.g., of a season) to display further details e.g., in the form of the posters displayed in the primary recently viewed window. Once displayed, the user can click on the image in the poster to be taken to the corresponding title. For example, by clicking on the image of "24" for day/season 8 (i.e., poster 1110), further details regarding that season of "24" may be displayed as illustrated in FIG. 12.

Title Detail Summary

Customers 214 may further be able to view all of the titles/seasons/etc. in a single grid referred to as the title detail summary screen. FIG. 12 illustrates a graphical user interface of the title detail summary screen in accordance with one or more embodiments of the invention. The screen illustrates a grid with each row representing a different episode for an identified season. In FIG. 12, each episode of season 8 of "24" is illustrated in a separate row. Columns in the table represent an identifier, an air date for the episode, and listings of content that may be available for each episode. For example, column 1202 represents images and corresponding icons in a particular row indicate the availability of images for the episode. Adjacent columns represent screener, broadcast, synopses, cast/crew identification, scripts, and music cues.

The icons displayed in each cell reflects the availability for the episode in the corresponding row and the information identified in the corresponding column. The icons in each cell may also be color coded or provide additional details. For example, in the interface of FIG. 12, icons may be displayed in green, yellow, or red, where green represents available assets, red represents the lack of availability, and yellow represents pending. Thus, icons in rows 1204 through 1206 of the screener column 1208 represents that the corresponding episodes are available for screening. Similarly, the remaining rows in the screener column 1208 are displayed in a different color/shade indicating that such episodes are not available for screening (e.g., in the screening room). The different colors/shading serve to inform the customer 214 if the corresponding item (e.g., title or asset) is available (e.g., for download, screening, etc.) in a single viewing area.

Customers 214 can select an icon in the scripts and music cues columns to add checkmarks (or other indicators) to each cell which will add such corresponding selected items into the user's cart (e.g., the user's asset cart).

Versatile Use of Media Players Across Multiple Platforms Worldwide

Embodiments of the invention may further provide for multi-platform (e.g., PC and Mac) global accessibility of digital rights management (DRM) protected, full length video for online streaming and/or download use. In this regard, embodiments provide for full length DRM protected content worldwide that is not limited to certain markets/platforms. A custom media player is used to establish/confirm licenses.

Figure 13:
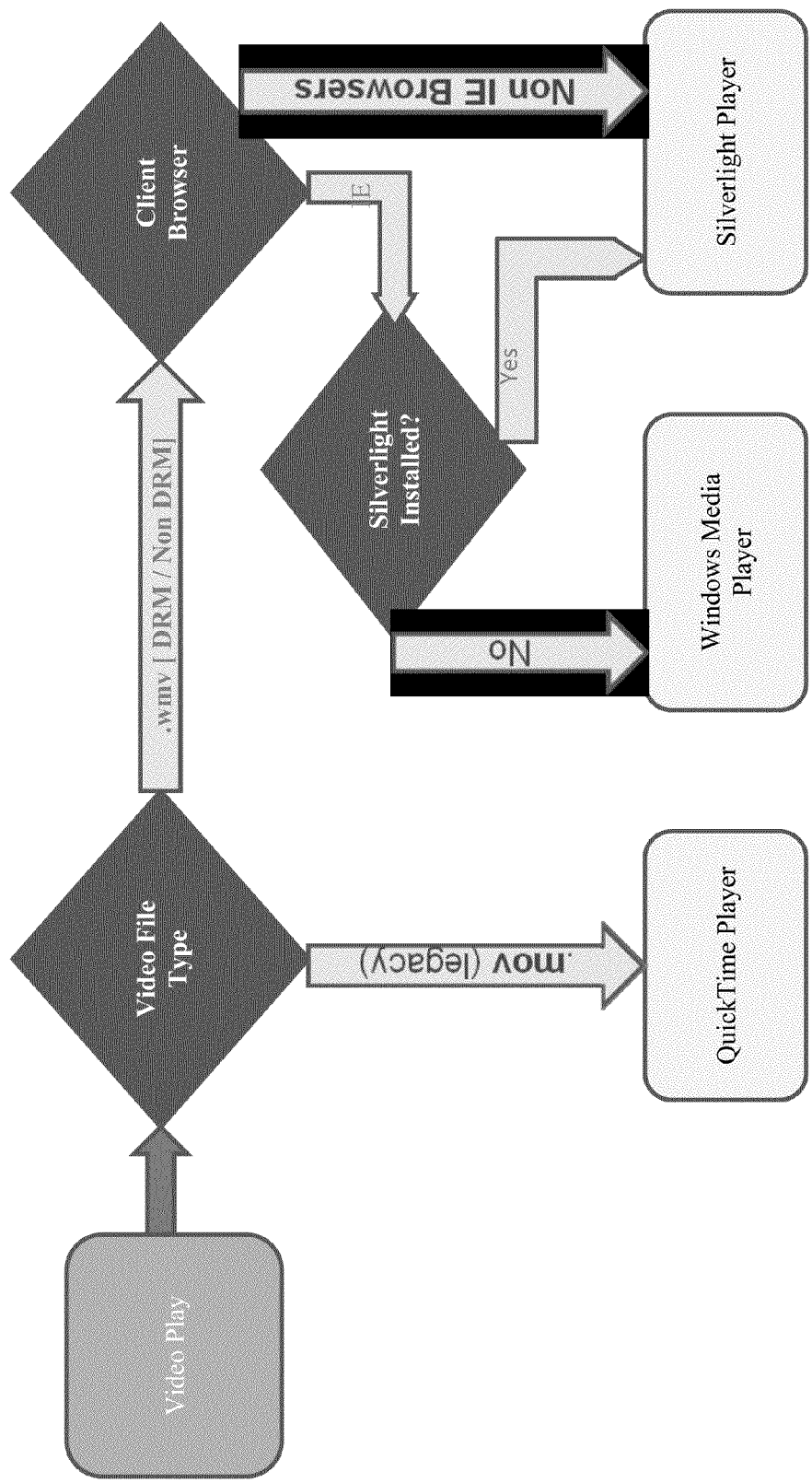
FIG. 13 is a flowchart illustrating the logical flow for using media players across multiple platforms worldwide in accordance with one or more embodiments of the invention.

FIG. 13 is a flowchart illustrating the logical flow for using media players across multiple platforms worldwide in accordance with one or more embodiments of the invention. Once a user opts to play a video, a determination is made regarding the type of video file. If the file is a ".mov" (e.g., a legacy file), a QUICKTIME™ player is invoked to play the video. If the video is ".wmv" file (either DRM or non-DRM), a determination is made regarding the type of client browser being utilized. Depending on the browser type, a further inquiry may be conducted regarding the development environment/application framework being utilized. For example, if the browser is MICROSOFT™ INTERNET EXPLORER™, a determination is made regarding whether the SILVERLIGHT™ application framework has been installed. If either (1) a browser other than INTERNET EXPLORER™ is being used, or (2) the SILVERLIGHT™ application framework has been installed, a SILVERLIGHT™ framework player may be utilized to play the video. However, if the SILVERLIGHT™ application framework has not been installed, a different media player (e.g., the WINDOWS™ MEDIA PLAYER™) may be used to play the video.

Figure 14:
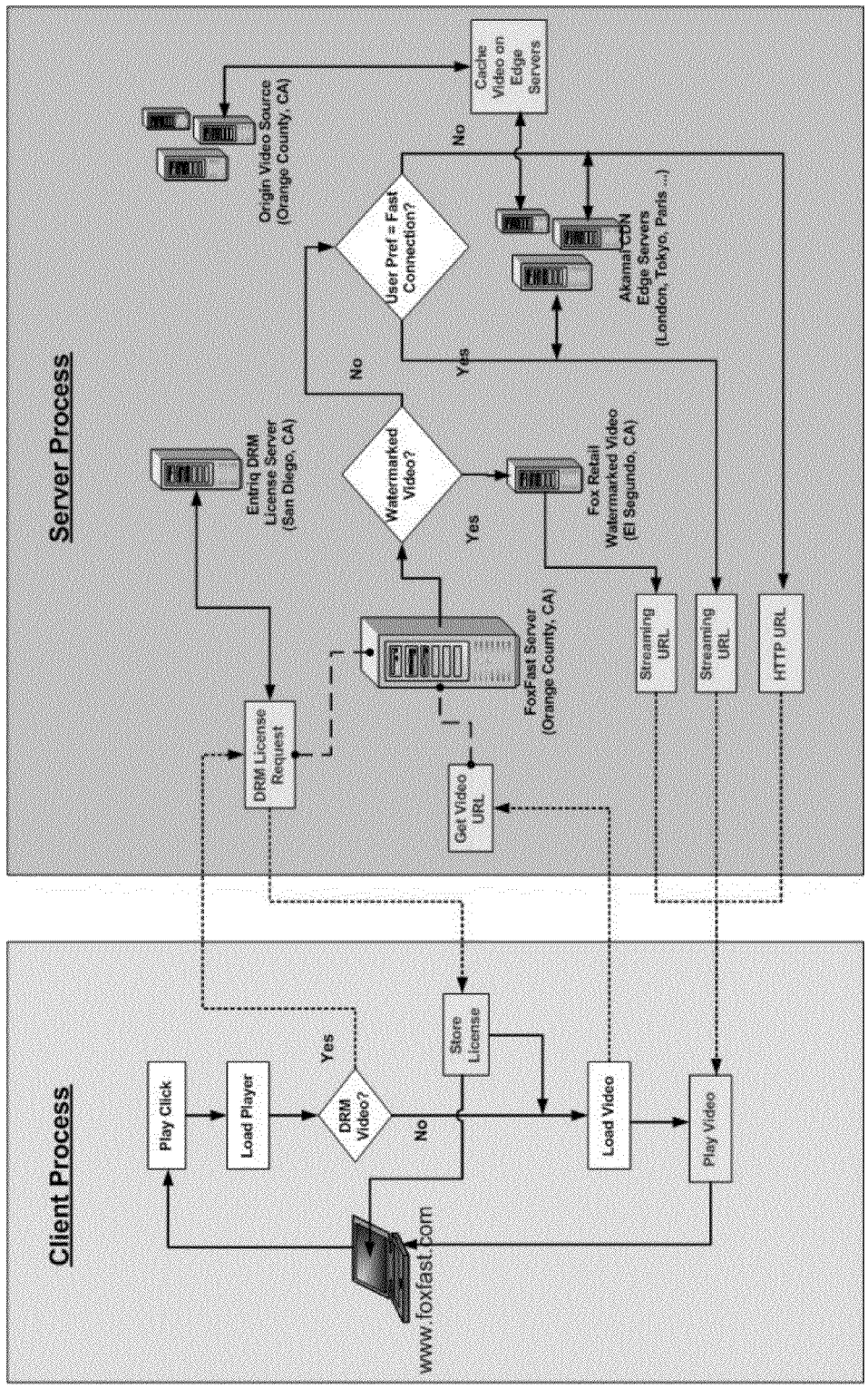
FIG. 14 illustrates the overall architecture for the video player in accordance with one or more embodiments of the invention.

FIG. 14 illustrates the overall architecture for the video player in accordance with one or more embodiments of the invention. The customer 214 first elects to play a video and a player is loaded in response thereto. If DRM video is not included, the video is loaded and played. If DRM video is included, a license request is processed by the server and stored at the client. The video may be one that must be watermarked, which means that the player accesses a specially watermarked copy. A determination is made regarding how fast the user's connection is. If a true streaming/fast connection is the user's preference, the video is streamed to the user. If not, the video is streamed using progressive download. For improved performance, videos may be cached on various servers in a CDN (content delivery network) and streamed.

Figure 15:
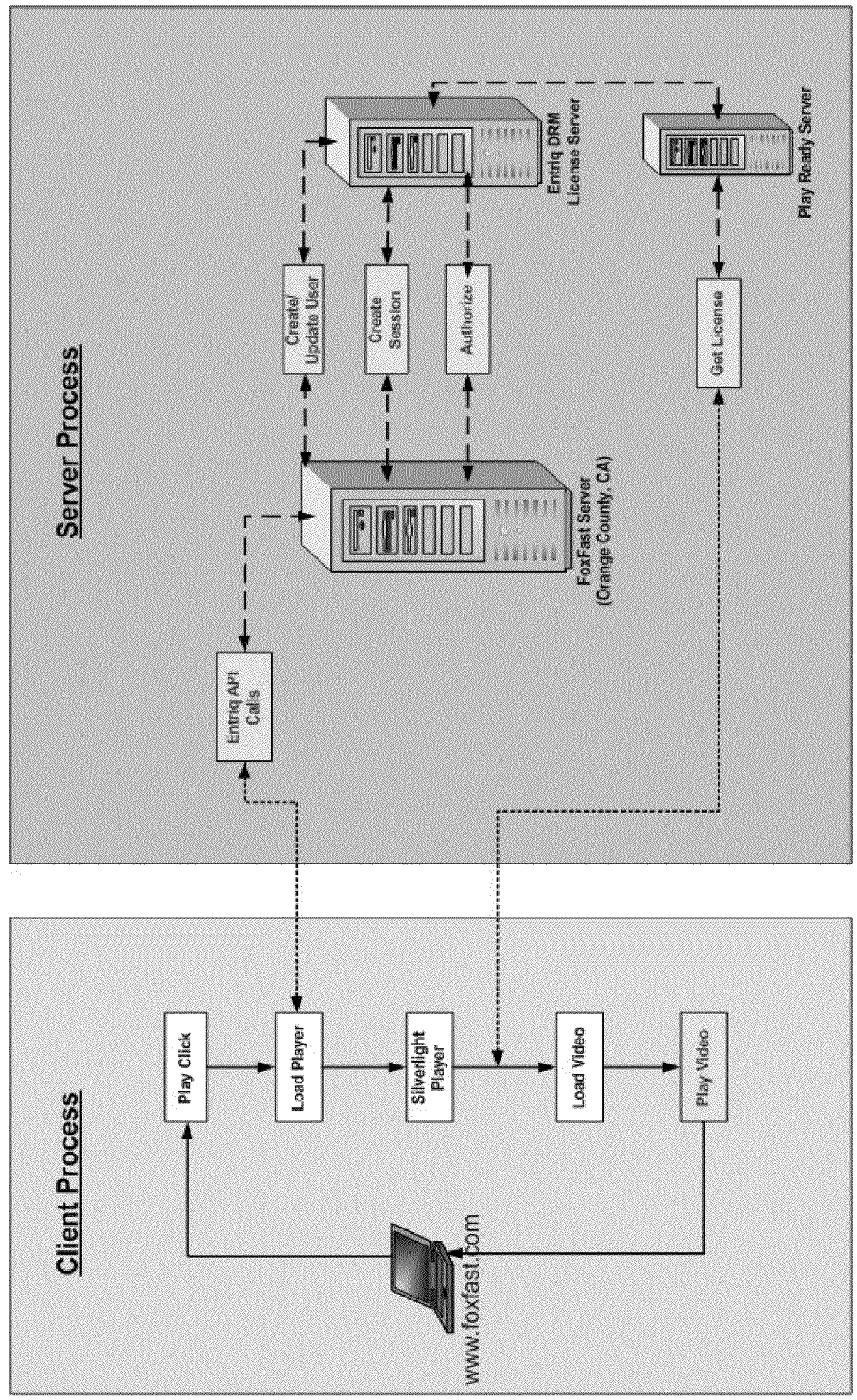
FIG. 15 illustrates the SILVERLIGHT™ player calls used in accordance with one or more embodiments of the invention.

When loading the player in FIG. 14, a determination may be made regarding the appropriate player to utilize. FIG. 15 illustrates the SILVERLIGHT™ player calls used in accordance with one or more embodiments of the invention. Application programming interface (API) calls are made to a server to load the player. The calls provide the ability to create/update a user, create a session, and authorize the player to playback video. As illustrated, a license for the particular video requested may be requested and obtained in conjunction with the video player access rights. The resulting license can then be passed back to the client to enable playback of the video.

Logical Flow

FIG. 16 illustrates the logical flow for delivering media content in accordance with one or more embodiments of the invention. At step 1602, media content and marketing assets (for the media content) are stored in a repository.

At step 1604, access to the media content and marketing assets are provided via a website that is accessible on the internet worldwide to client computer. The website is configured to enable the client computers with the capability to perform steps 1606-1610. Further, default settings may be established for the website (e.g., user preferences for configuring the display of the website).

At step 1610, the client computers can search a public site catalog/library of media content that is publicly available. Search capabilities may include the capabilities to search by keyword, product categories, genres, run times, and themes. Once logged in, the catalog can still be searched but further enhancements are provided to the user. For example, the viewed posters or search results may be color coded to indicate whether media content is licensed or non-licensed by the logged-in/authorized user. In this regard, when the one or more authorized client users are logged in, the website is configured to modify the viewing and search of the public site catalog to the one or more authorized client users such that the public site catalog is color-coded to indicate whether media content in the private catalog is licensed or non-licensed by the one or more authorized client users.

At step 1612, the marketing assets for licensed media content are provided from the library to authorized client users on the client computers in a secure manner. The authorized client users are authorized based on a license to the licensed media content. The licensed media content may further include production level intellectual property and concept for a media content title.

At step 1614, preview screening access and download access for licensed media content is provided to the authorized client users. The licensed media content includes titles of audio-visual media content. Preview screening access may further include a season pass selected by an authorized client user that is enabled to screen, via streaming video, licensed media content for an entire season of a specific title. In addition, when determining licensed media content to download, search capabilities may be advanced (as described above) and search results may be grouped by title and/or licensed titles and include different video formats.

The website capabilities may further include the ability to view different levels of titles of media content from a series to a season to an episode and vice versa. In this regard, in response to requesting details relating to a series, season information for the series may be displayed. Similarly, in response to requesting series details for a particular season, details regarding the series for that season can be displayed. In a similar fashion, details regarding episodes and seasons may be displayed and the client user can traverse across the different levels of viewing in an efficient manner (e.g., by selecting arrow icons representing a traversal action).

Both steps 1608 and 1610 may be controlled using a shopping cart—a title cart for lists of titles, and an asset cart for marketing and media assets for licensed content. A user can place both media content/titles and marketing assets into a shopping cart for later download/use. However, items placed into the shopping cart may be limited to licensed items—e.g., media content that is licensed by the customer and marketing assets for licensed media content.

As an additional mechanism to view and manage content and assets, embodiments of the invention may provide a title detail summary screen that consists of a grid. The grid indicates media content titles (e.g., in rows) and (in columns) an availability of marketing assets, screening capabilities, broadcast quality video download capabilities, and media content information for each media content title in the grid. Such availability may be indicated using colors (e.g., red/yellow/green).

In addition, preview screening capabilities under step 1610 may be provided by a media player that is configured to provide multi-platform global accessibility of digital rights management (DRM) protected, full length video for online streaming.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention and the use of digital and file-based content delivery systems may provide one or more of the following benefits.

Cost Savings and Productivity: licensees who accept file-based content delivery will benefit from digital delivery through the elimination of tape, shipping and physical media management costs while simultaneously increasing productivity.

Quality: Digital files may be maintained in broadcast quality video standards.

Convenience: all video assets will be accessible to licensees 24/7 subject to existing licensing arrangements.

Ease of Use: all video assets are well organized on a website for easy searching, locating and downloading.

Accessibility: multi-user access to filed-based video eliminates the need for internal tape copying and distribution.

Interoperability: files are compatible with both PCs and MACs.

Speed: point-to-point content distribution ensures files are delivered directly to where they need to be as soon as a file is accessed.

Storage: content is available using server-based storage allowing users to add flexibility to their own storage requirements.

Security: preview files are protected with digital rights management (DRM) software wrappers. Broadcast files are encrypted during transport and delivered via the internet. For some sensitive content, forensic watermarking may be applied. Additional forensic measures may also be used to guard the value of content against unauthorized use.

Digital Conversion: introduces licensees to file-based video formats and establishes an entry point for broadcasters to institutionalize digital workflows.

Eco-Friendly: Eliminates manufacturing, shipping and tape management infrastructure required to support physical deliveries thereby drastically reducing carbon emissions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for providing multi-platform accessibility of media content in a global computer network comprising:
   (a) a client computer device configured to:
      (i) select the media content to play;
         based on a format of media content, loading, a media content player;
   (b) the media content player configured to:
      (i) receive the media content from various servers that have cached the media content in a content delivery network;
      (ii) if the media content does not comprise digital rights managements (DRM) protected content, load and play, via a web server computer, the media content player; and
      (iii) if the media content comprises DRM protected content:
         (A) request, via application programming interface (API) calls to a server process, a license to play the media content;
         (B) receive, from the server process, the license to play the media content, wherein the server process is configured to obtained the license by:
            (1) a web server computer creating/updating an authorized client user by communicating with a DRM server;
            (2) the web server computer creating a session between the web server computer and the DRM server;
            (3) the web server computer enabling authorization to play the media content by communicating with the DRM server;
            (4) the DRM server transmitting the license to the client computer; and
         (C) based on the license, load and play, the media content.

2. The system of claim 1, further comprising storing the license received from the server process at the client computer.

3. The system of claim 1, wherein:
   if a client connection is beyond a connection speed threshold, receiving the media content at the client computer, from the server process, via streaming across the client connection; and
   if the client connection is lower than the connection speed threshold, receiving the media content at the client, from the server process, via progressive download.

4. A computer implemented method for providing multi-platform accessibility of media content in a global computer network comprising:
   (a) selecting, in a client computer, the media content to play;
   (b) based on a format of media content, loading, in the client computer, a media content player;
   (c) receiving the media content from various servers that have cached the media content in a content delivery network;
   (d) if the media content does not comprise digital rights managements (DRM) protected content, loading and playing, via a web server computer, the media content in the media content player; and
   (e) if the media content comprises DRM protected content:
      (i) requesting, via application programming interface (API) calls to a server process, a license to play the media content;
      (ii) receiving, from the server process, the license to play the media content, wherein the server process is configured to obtained the license by:
         (1) a web server computer creating/updating an authorized client user by communicating with a DRM server;
         (2) the web server computer creating a session between the web server computer and the DRM server;
         (3) the web server computer enabling authorization to play the media content by communicating with the DRM server;
         (4) the DRM server transmitting the license to the client computer; and
      (iii) based on the license, loading and playing, in the media content player, the media content.

5. The method of claim 4, further comprising storing the license received from the server process at the client computer.

6. The method of claim 4, wherein:
   if a client connection is beyond a connection speed threshold, receiving the media content at the client computer, from the server process, via streaming across the client connection; and
   if the client connection is lower than the connection speed threshold, receiving the media content at the client, from the server process, via progressive download.

7. A non-transitory computer readable storage medium encoded with computer program instructions which when accessed by a client computer causes the client computer to load the program instructions to a memory therein creating a special purpose data structure causing the client computer to operate as a specially programmed computer, executing a method of providing multi-platform accessibility of media content in a global computer network comprising:
   (a) selecting, in the client computer, the media content to play;
   (b) based on a format of media content, loading, in the client computer, a media content player;
   (c) receiving, in the client computer, the media content from various servers that have cached the media content in a content delivery network;
   (d) if the media content does not comprise digital rights managements (DRM) protected content, loading and playing, in the client computer, via a web server computer, the media content in the media content player; and
   (e) if the media content comprises DRM protected content:
      (i) requesting, via application programming interface (API) calls to a server process, a license to play the media content;
      (ii) receiving, in the client computer from the server process, the license to play the media content, wherein the server process is configured to obtained the license by:
         (1) a web server computer creating/updating an authorized client user by communicating with a DRM server;

(2) the web server computer creating a session between the web server computer and the DRM server;
(3) the web server computer enabling authorization to play the media content by communicating with the DRM server;
(4) the DRM server transmitting the license to the client computer; and
(iii) based on the license, loading and playing, in the media content player, the media content.

8. The non-transitory computer readable storage medium of claim 7, further comprising storing, in the client computer, the license received from the server process at the client computer.

9. The non-transitory computer readable storage medium of claim 7, wherein:
if a client connection is beyond a connection speed threshold, receiving the media content at the client computer, from the server process, via streaming across the client connection; and
if the client connection is lower than the connection speed threshold, receiving the media content at the client, from the server process, via progressive download.

* * * * *

UNITED STATES PATENT AND TRADEMARK OFFICE
CERTIFICATE OF CORRECTION

PATENT NO.         : 9,075,998 B2
APPLICATION NO.    : 14/047729
DATED              : July 7, 2015
INVENTOR(S)        : Elaine M. Spooner et al.

It is certified that error appears in the above-identified patent and that said Letters Patent is hereby corrected as shown below:

In the claims

Column 19

Lines 19-20 delete the text, "based on a format of media content, loading, a media content player;"

and insert the text, --based on a format of media content, loading a media content player;--

Column 19

Lines 25-28 delete the text, "(ii) if the media content does not comprise digital rights managements (DRM) protected content, load and play, via a web server computer, the media content player; and;"

and insert the text, --(ii) if the media content does not comprise digital rights managements (DRM) protected content, load and play, via a web server computer, the media content; and;--

Column 19

Lines 34-36 delete the text, "(B) receive, from the server process, the license to play the media content, wherein the server process is configured to obtained the license by:"

and insert the text, --(B) receive, from the server process, the license to play the media content, wherein the server process is configured to obtain the license by:--

Column 19

Lines 48-49 delete the text, "(C) based on the license, load and play, the media content."

Signed and Sealed this
Ninth Day of August, 2016

Michelle K. Lee
*Director of the United States Patent and Trademark Office* and insert the text, --(C) based on the license, load and play the media content.--

Column 20

Lines 12-14 delete the text, "(ii) receiving, from the server process, the license to play the media content, wherein the server process is configured to obtained the license by:"

and insert the text, --(ii) receiving, from the server process, the license to play the media content, wherein the server process is configured to obtain the license by:--